US011178362B2

(12) United States Patent
Kinoshita

(10) Patent No.: US 11,178,362 B2
(45) Date of Patent: Nov. 16, 2021

(54) MONITORING DEVICE, MONITORING METHOD AND STORAGE MEDIUM

(71) Applicant: PANASONIC I-PRO SENSING SOLUTIONS CO., LTD., Fukuoka (JP)

(72) Inventor: Hidetoshi Kinoshita, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/773,271

(22) Filed: Jan. 27, 2020

(65) Prior Publication Data
US 2020/0244926 A1 Jul. 30, 2020

(30) Foreign Application Priority Data

Jan. 30, 2019 (JP) .............................. JP2019-014367

(51) Int. Cl.
*G06F 3/0481* (2013.01)
*H04N 7/18* (2006.01)
*G06F 3/0484* (2013.01)
*H04N 5/262* (2006.01)

(52) U.S. Cl.
CPC ........... *H04N 7/181* (2013.01); *G06F 3/0481* (2013.01); *G06F 3/04847* (2013.01); *H04N 5/2628* (2013.01)

(58) Field of Classification Search
CPC ... G06F 3/0481; G06F 3/04847; H04N 7/181; H04N 5/2628
See application file for complete search history.

(56) References Cited

U.S. PATENT DOCUMENTS

| 2010/0119172 | A1* | 5/2010 | Yu ........................... G06T 5/006 |
| | | | 382/256 |
| 2012/0275725 | A1* | 11/2012 | Kelly .................... G06T 3/0018 |
| | | | 382/300 |
| 2014/0347470 | A1* | 11/2014 | Zhang ................... G06T 3/4038 |
| | | | 348/118 |
| 2015/0358539 | A1* | 12/2015 | Catt .................... H04N 5/23238 |
| | | | 348/38 |
| 2016/0112629 | A1* | 4/2016 | Lee ........................ H04N 7/183 |
| | | | 348/39 |
| 2016/0119551 | A1* | 4/2016 | Brown .................. G06T 3/0062 |
| | | | 345/646 |

(Continued)

FOREIGN PATENT DOCUMENTS

JP 2008-118466 5/2008

*Primary Examiner* — Phenuel S Salomon
(74) *Attorney, Agent, or Firm* — Greenblum & Bernstein, P.L.C.

(57) ABSTRACT

A monitoring device includes a receiver, configured to receive a fisheye image of a bird's eye viewpoint captured by a plurality of monitoring cameras, an image transformer, configured to transform the fisheye image into a rectangular image of the bird's eye viewpoint or a different viewpoint image which is an image of a viewpoint different from the bird's eye viewpoint, and a controller, configured to provide a user interface which arranges a plurality of image windows respectively corresponding to the plurality of monitoring cameras, displays the rectangular image in the image windows, and switches a displayed image to the different viewpoint image for each image window.

9 Claims, 24 Drawing Sheets

(56) References Cited

U.S. PATENT DOCUMENTS

| | | | |
|---|---|---|---|
| 2017/0185828 A1* | 6/2017 | Yamamoto | G06T 7/292 |
| 2017/0324948 A1* | 11/2017 | Lin | G06T 19/20 |
| 2018/0210442 A1* | 7/2018 | Guo | G05D 1/0016 |
| 2018/0288383 A1* | 10/2018 | Waniguchi | H04N 5/272 |
| 2019/0130540 A1* | 5/2019 | Ding | B60R 1/00 |
| 2019/0197671 A1* | 6/2019 | Jeong | G06T 5/006 |
| 2019/0295299 A1* | 9/2019 | Park | G06T 7/90 |

* cited by examiner

MONITORING DEVICE, MONITORING METHOD AND STORAGE MEDIUM

CROSS REFERENCE TO RELATED APPLICATIONS

This application is based upon and claims the benefit of priority of Japanese Patent Application No. 2019-14367 filed on Jan. 30, 2019, the contents of which are incorporated herein by reference in its entirety.

BACKGROUND OF THE INVENTION

1. Field of the Invention

The present disclosure relates to a monitoring device, a monitoring method, and a storage medium storing a computer program.

2. Description of the Related Art

In a known monitoring system, images captured by each monitoring camera placed in a given building are received via a network and displayed on a display. JP-A-2008-118466 referred to as Patent Literature 1 discloses a monitoring system which can easily monitor an overall situation by combining the images captured by each monitoring camera into a single image and displaying the combined image.

Patent Literature 1: JP-A-2008-118466

SUMMARY OF THE INVENTION

As described in Patent Literature 1, when the plurality of images are combined into the single image and displayed, the overall situation can be easily monitored. However, it becomes difficult to distinguish relationships between the monitoring cameras and the images, and becomes complicated to perform operations on each individual image.

A non-limited object of the present disclosure is to provide a monitoring device, a monitoring method, and a storage medium storing a computer program that can easily grasp a situation of a monitoring area in which a monitoring camera is placed and can easily operate each individual image.

There is provided a monitoring device according to an aspect of the present disclosure, including: a receiver, configured to receive a fisheye image of a bird's eye viewpoint captured by a plurality of monitoring cameras; an image transformer, configured to transform the fisheye image into a rectangular image of the bird's eye viewpoint or a different viewpoint image which is an image of a viewpoint different from the bird's eye viewpoint; and a controller, configured to provide a user interface (UI) which arranges a plurality of image windows respectively corresponding to the plurality of monitoring cameras, displays the rectangular image in the image windows, and switches a displayed image to the different viewpoint image for each image window.

It should be noted that these comprehensive or specific aspects may be realized by a system, a method, an integrated circuit, a computer program, or a recording medium, or may be realized by any combination of the system, the device, the method, the integrated circuit, the computer program, and the recording medium.

According to an aspect of the present disclosure, the situation of the monitoring area in which the monitoring camera is placed can be easily grasped, and each individual image can be easily operated.

Further advantages and effects of one embodiment of the present disclosure will become apparent from the specification and drawings. These advantages and/or effects are provided by features described in several embodiments and the specification and drawings, but it is not necessary to provide all the embodiments and the specification and drawings to obtain one or more identical features.

DETAILED DESCRIPTION OF THE EXEMPLARY EMBODIMENTS (One Embodiment)

Hereinafter, one embodiment will be described in detail with reference to the drawings. Unnecessarily detailed descriptions may be omitted. For example, a detailed description of a well-known matter or a repeated description of substantially the same configuration may be omitted. This is to avoid unnecessary redundancy in the following description and to facilitate understanding of those skilled in the art.

It should be noted that the accompanying drawings and the following description are provided for a thorough understanding of the present disclosure by those skilled in the art, and are not intended to limit the subject matter recited in the claims.

<Monitoring System>

Figure 1:
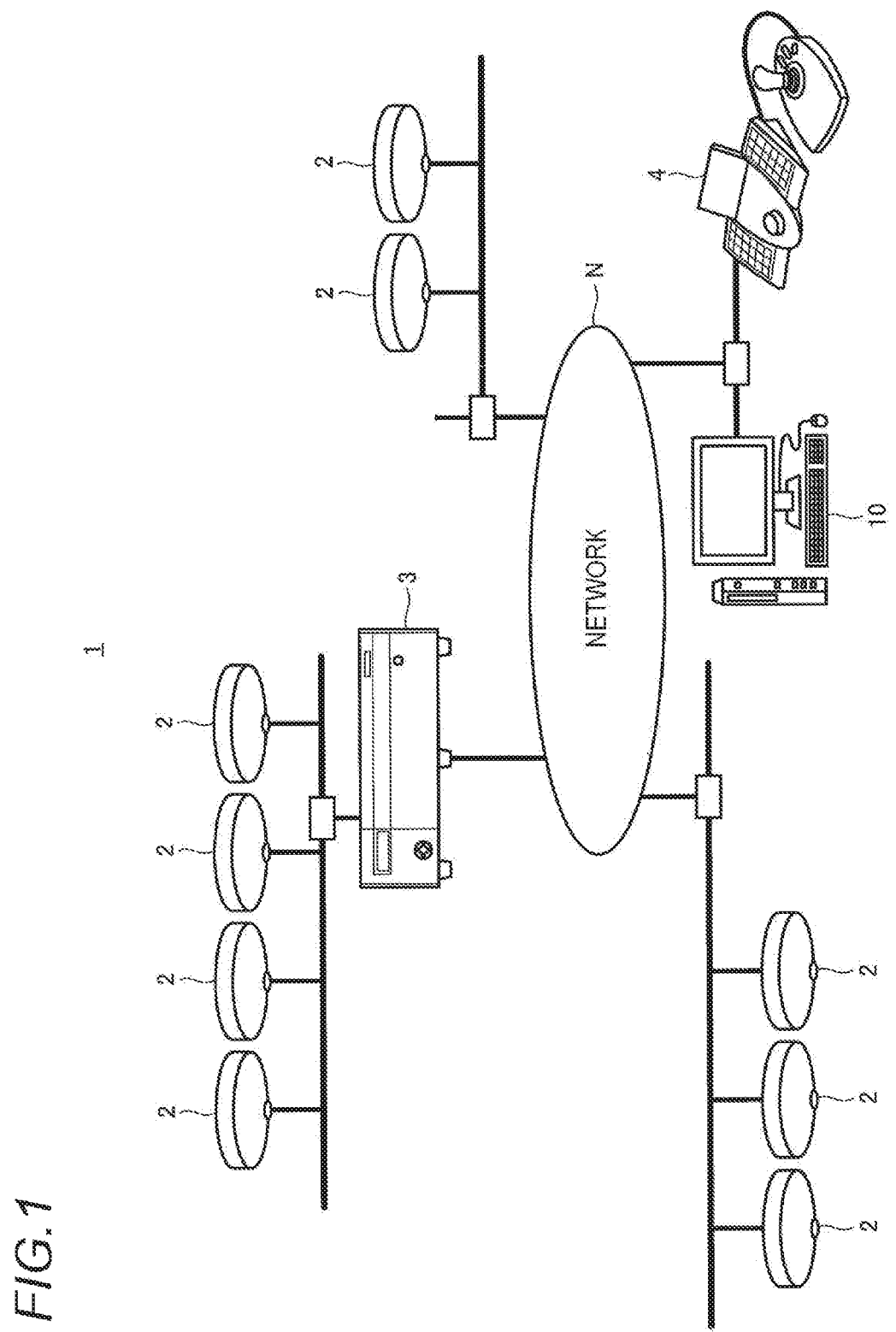
FIG. 1 shows a configuration example of a monitoring system according to one embodiment.

FIG. 1 shows a configuration example of a monitoring system according to the one embodiment.

As shown in FIG. 1, a monitoring system 1 includes a plurality of monitoring cameras 2, a recorder 3, an operation device 4, and a monitoring device 10. The plurality of monitoring cameras 2, the recorder 3, the operation device 4, and the monitoring device 10 are connected to a network N. The network N may be a local area network (LAN), a wide area network (WAN), or a combination thereof. The network N may be either a wired network or a wireless network.

The monitoring cameras 2 are placed at high places, such as a ceiling, and capture images of bird's eye viewpoints (for example, images of below). Each monitoring camera 2 may include a lens which can capture a wide viewing angle, like that of a fisheye camera or an omnidirectional camera. That is, an image captured by the monitoring camera 2 may be a fisheye image. The monitoring camera 2 transmits the captured image to the recorder 3 and/or the monitoring device 10 via the network N.

The recorder 3 records (video-records) the image transmitted from the monitoring camera 2 in a predetermined storage. The storage is, for example, a hard disk drive (HDD) or a solid state drive (SSD).

The operation device 4 is a device for a monitoring operator to operate the monitoring device 10. The operation device 4 may be, for example, a keyboard, a mouse, a touch pad, and/or an operation stick.

The monitoring device 10 generates a monitoring user interface (UI) including the image received from each monitoring camera 2 or the recorder 3 and displays the UI on a display. The image included on the monitoring UI may be an image (hereinafter, referred to as the "transformed image") obtained by transforming the image received from the monitoring camera 2 (hereinafter referred to as the "original image"). The monitoring UI and the transformed image will be described below.

In the monitoring device 10, the monitoring UI may include a diagram of a monitoring area of the monitoring camera 2 (hereinafter, referred to as the "monitoring area diagram"). The monitoring device 10 may receive an operation performed on the monitoring UI from the operation device 4.

<Configuration of Monitoring Device>

Next, an example of the configuration of the monitoring device 10 will be described with reference to FIG. 2.

Figure 2:
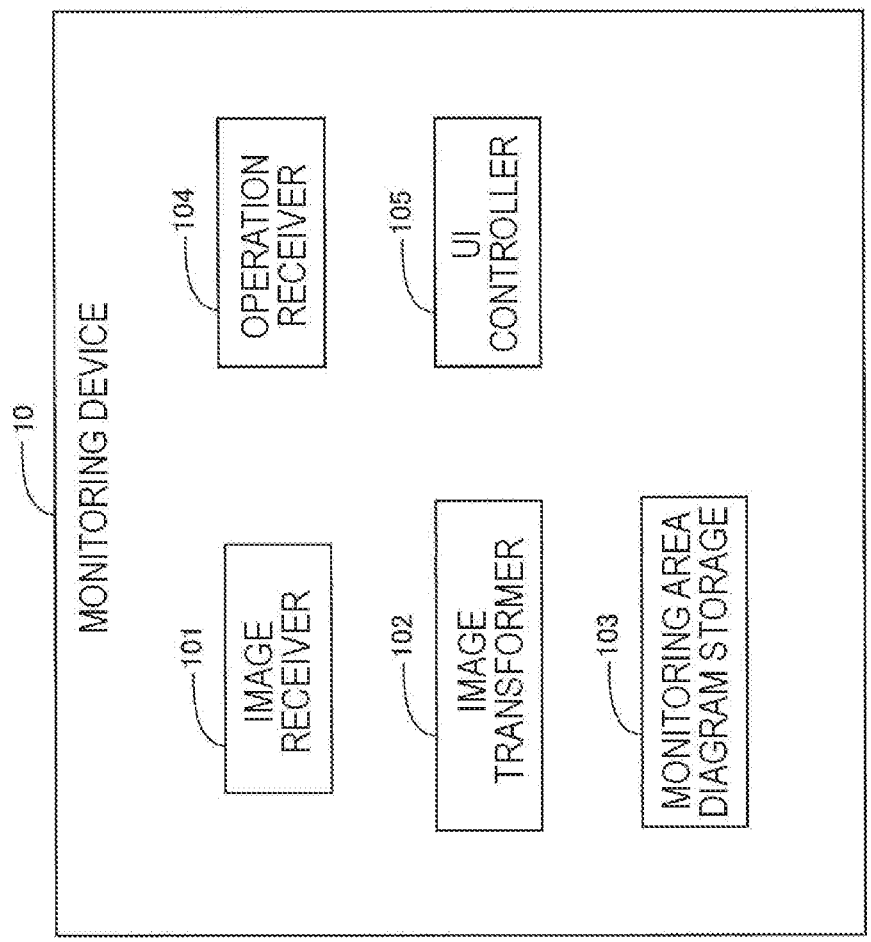
FIG. 2 shows a configuration example of a monitoring device according to the one embodiment.

As shown in FIG. 2, the monitoring device 10 includes an image receiver 101, an image transformer 102, a monitoring area diagram storage 103, an operation receiver 104, and a UI controller 105.

Figure 3:
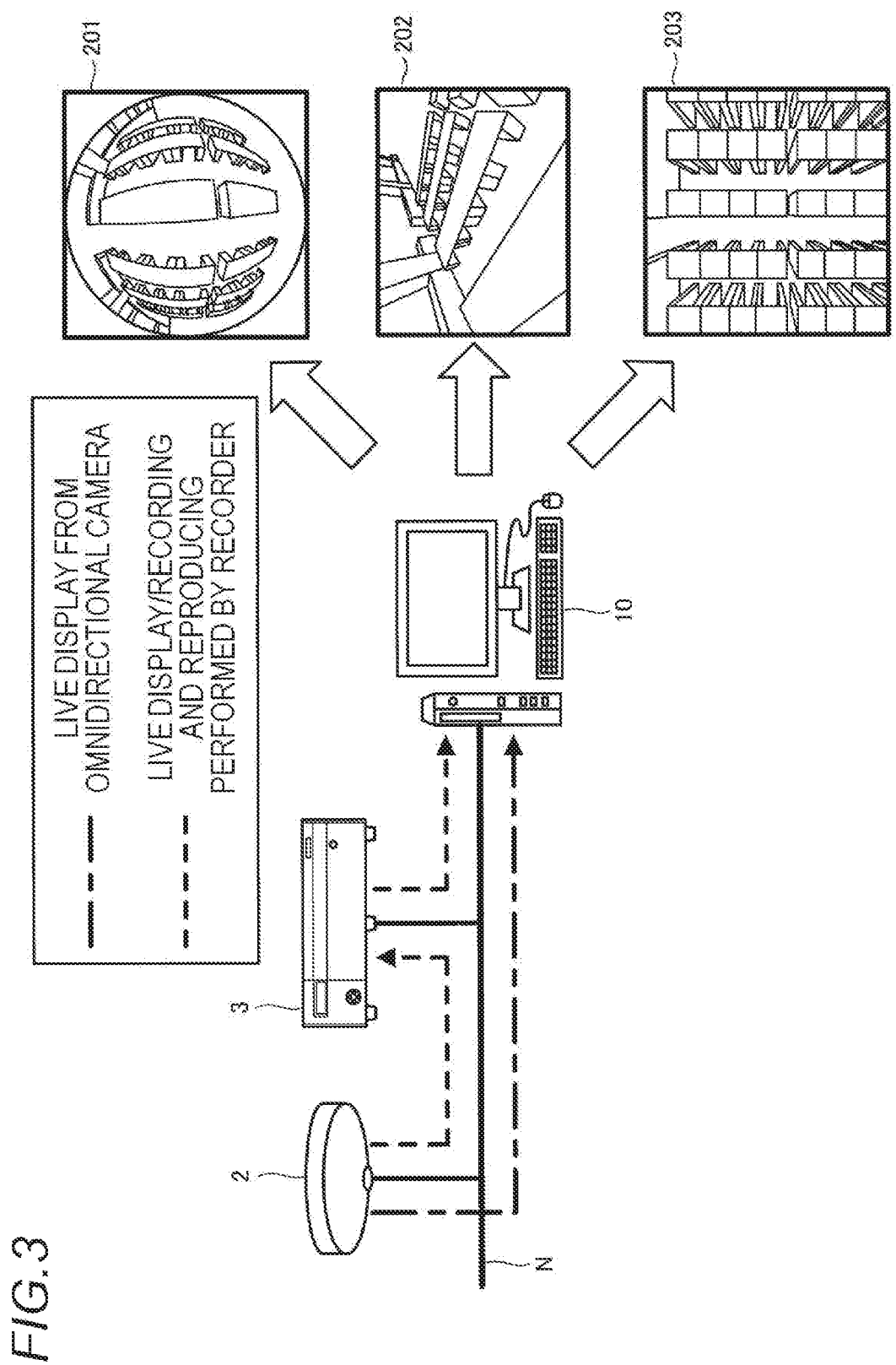
FIG. 3 shows an example of a fisheye image, a PTZ image, and a rectangular image according to the one embodiment.

As shown in FIG. 3, the image receiver 101 receives the original image from each monitoring camera 2 or the recorder 3 via the network N.

Figure 4:
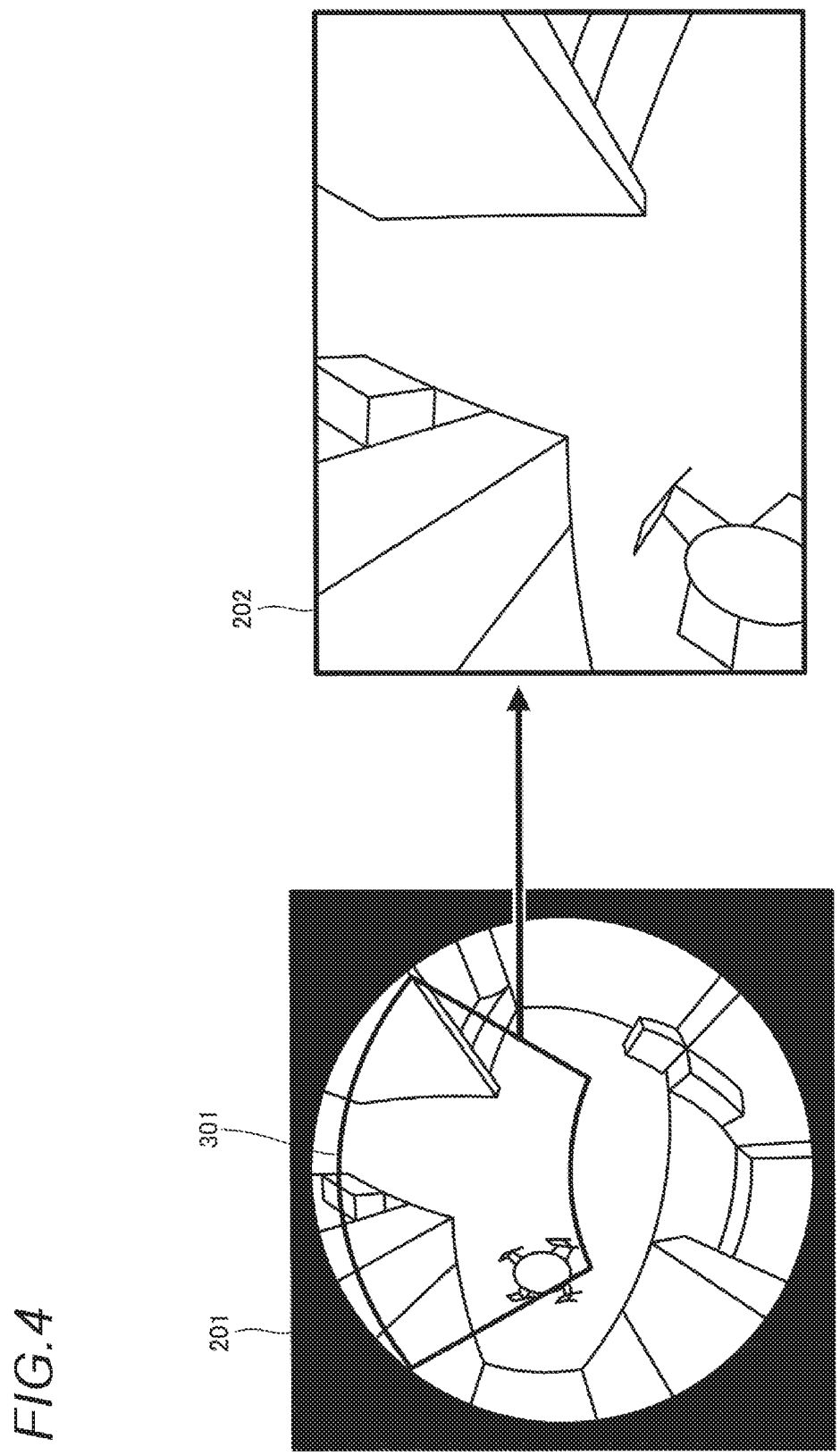
FIG. 4 shows an example of transforming the fisheye image into the PTZ image according to the one embodiment.

The image transformer 102 transforms the original image and generates the transformed image. For example, as shown in FIG. 3, the image transformer 102 transforms a fisheye image 201, which is an example of the original image, and generates a PTZ image 202, which is an example of the transformed image. As shown in FIG. 4, the PTZ image 202 is an image obtained by panning, tilting, and/or zooming a partial region 301 of the fisheye image 201. That is, the PTZ image 202 is an example of a different viewpoint image, which is an image of a viewpoint different from the bird's eye viewpoint.

Figure 5:
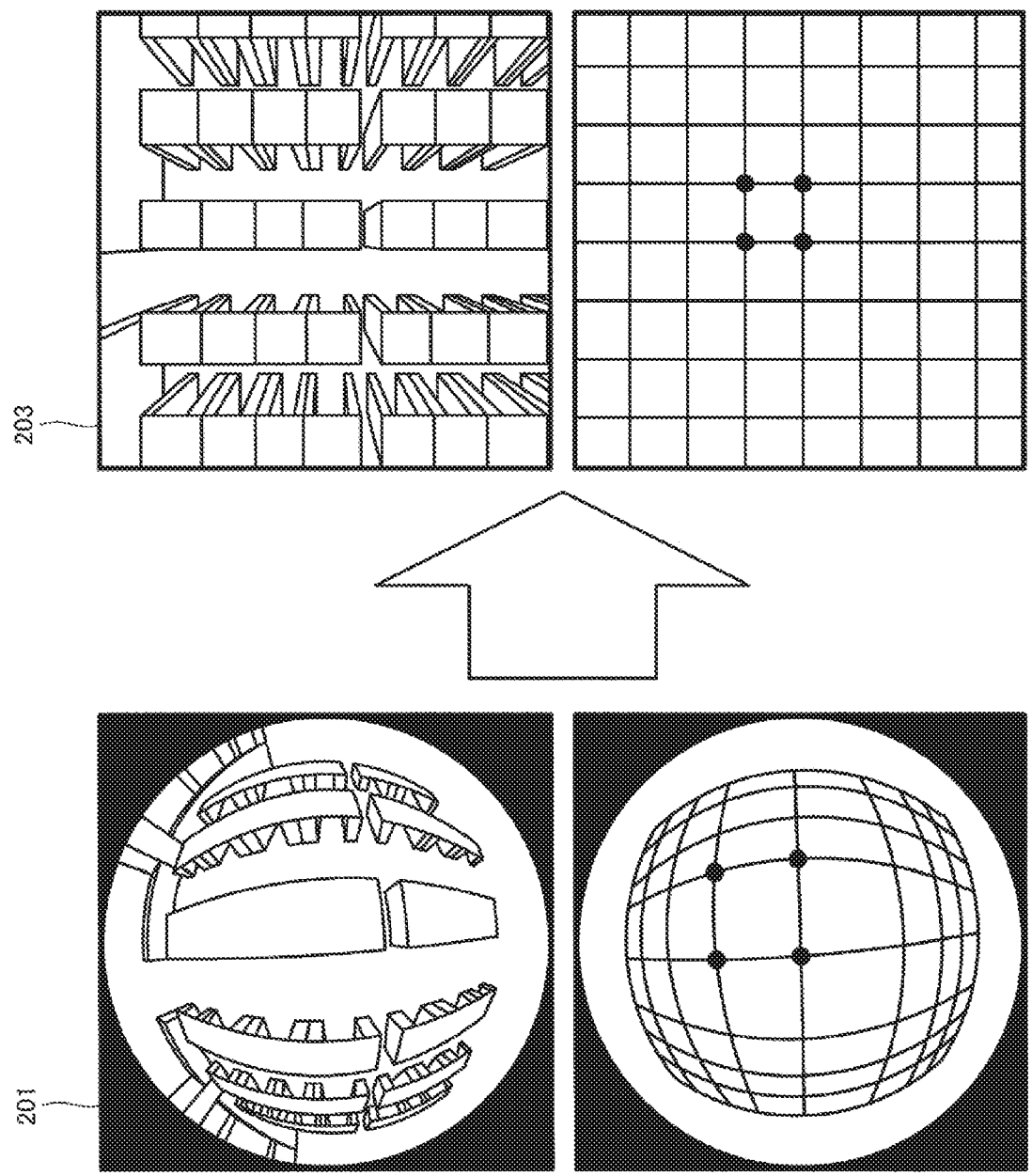
FIG. 5 shows an example of transforming the fisheye image into the rectangular image according to the one embodiment.

As shown in FIG. 3, the image transformer 102 transforms the fisheye image 201, which is the example of the original image, and generates a rectangular image 203 which is an example of the transformed image. As shown in FIG. 5, the rectangular image 203 is an image obtained by transforming the fisheye image 201 into a rectangular image. In other words, it can be said that the rectangular image 203 is an image obtained by correcting distortion of the fisheye image 201.

The monitoring area diagram storage 103 stores the monitoring area diagram. When a monitoring area is outdoors, the monitoring area diagram may be a map of a place where the monitoring cameras 2 are placed. When the monitoring area is in a building, the monitoring area diagram may be a sketch of a floor on which the monitoring cameras 2 are placed. That is, it can be said that the monitoring area diagram is a bird's eye view of the monitoring area. The monitoring area diagram storage 103 may acquire the monitoring area diagram from a predetermined server via the network N and store the monitoring area diagram.

The operation receiver 104 receives operation contents from the operation device 4, and transmits the operation contents to the UI controller 105.

The UI controller 105 generates the monitoring UI including the original image and/or the transformed image and displays the UI on the display. The UI controller 105 may include a monitoring area diagram on the monitoring UI.

Figure 6:
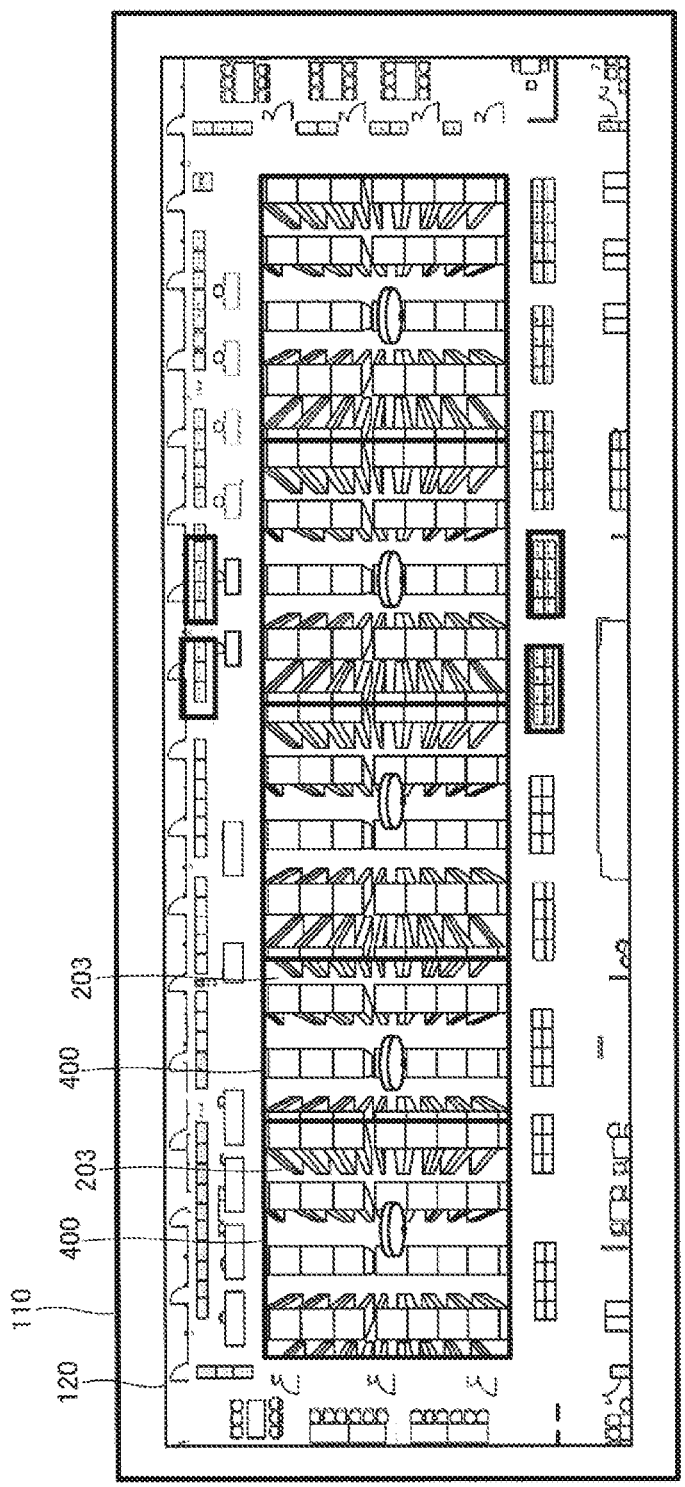
FIG. 6 shows a first example of a monitoring UI according to the one embodiment.

For example, as shown in FIG. 6, the UI controller 105 superimposes a plurality of image windows 400 respectively corresponding to the plurality of monitoring cameras 2 in the monitoring area on a monitoring area diagram 120 (sketch) to generate a monitoring UI 110. The UI controller 105 displays the rectangular image 203 transformed by the image transformer 102 on the image window 400 corresponding to the monitoring camera 2 that has captured the rectangular image 203. Since the monitoring area diagram 120 is a bird's eye view having an orthogonal coordinate system, the monitoring operator can easily grasp a situation of the monitoring area from the monitoring UI 110 by displaying the rectangular image 203, which is an image of the bird's eye viewpoint of the same orthogonal coordinate system, in the image window 400 superimposed on the monitoring area diagram 120. It should be noted that the monitoring operator may be replaced with another term such as an operator or a user.

Figure 7:
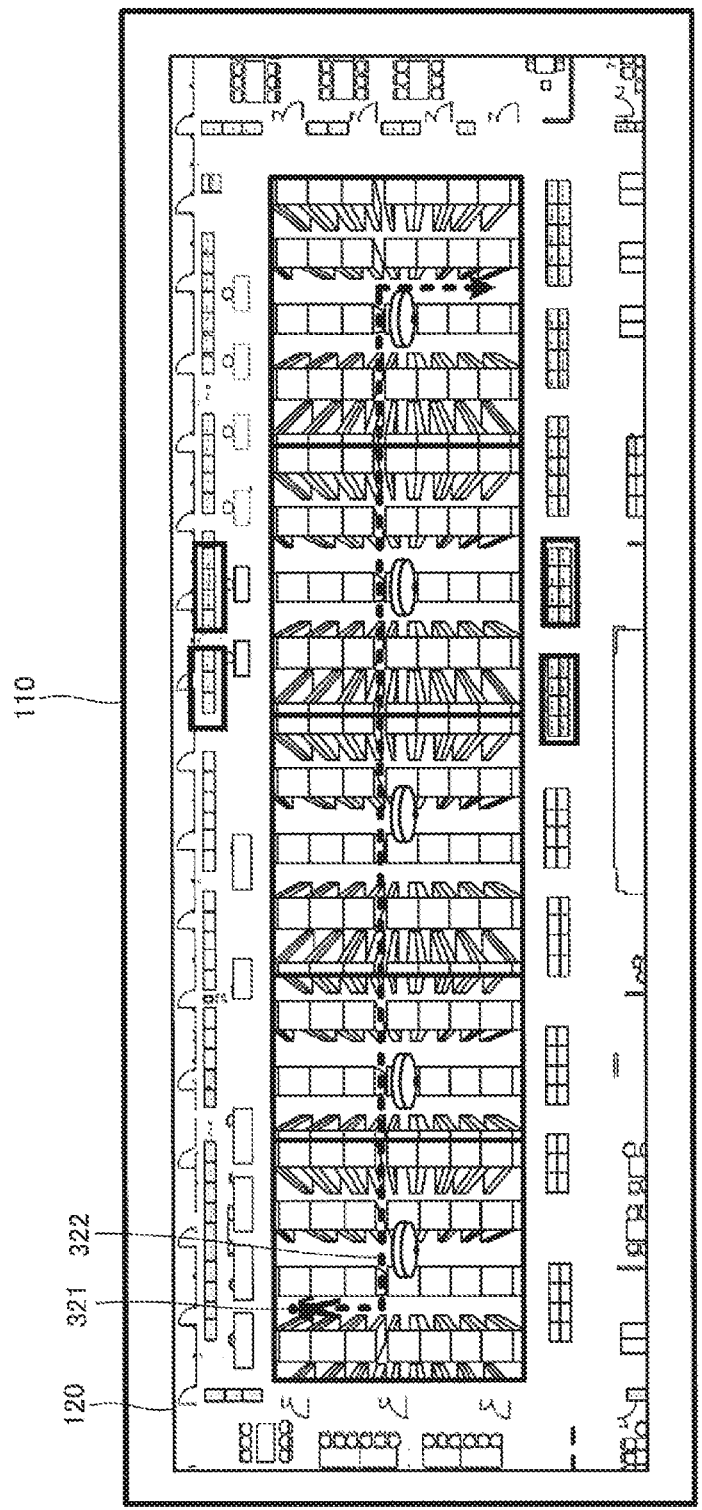
FIG. 7 shows an example of a movement path of a target of the monitoring UI according to the one embodiment.

As shown in FIG. 7, the rectangular image 203 is displayed on a plurality of image windows 400 superimposed on the monitoring area diagram 120, when a movement path 322 of a target 321, such as a person, straddles a plurality of rectangular images 203, since the movement path 322 is continuous between adjacent rectangular images 203, the monitoring operator can easily grasp the movement path 322 of the target 321. If a plurality of fisheye images 201 captured by the plurality of monitoring cameras 2 are displayed in parallel in this way (that is, without being transformed to the rectangular images 203), since the movement path 322 is hardly continuous between adjacent fisheye images 201, the monitoring operator is difficult to grasp the movement path 322 of the target 321. Therefore, the UI controller 105 may set the rectangular image 203 as a default image displayed in the image window 400. That is, when there is no special instruction given by the monitoring operator, the rectangular image 203 may be displayed in the image window 400.

The UI controller 105 receives an operation for setting image formats or setting image parameters on the monitoring UI 110. The image format setting and the image parameter setting will be described below <Image Format Setting>

Next, the image format setting will be described with reference to FIGS. 8 to 10.

The UI controller 105 receives an image format switching operation for each image window 400 included on the monitoring UI 110. For example, when the monitoring operator selects one image window 400 and performs the image format switching operation on the monitoring UI 110, the UI controller 105 displays an image format switching UI 330 including choices of "fisheye display", "PTZ display", and "rectangular display", as shown in FIG. 8.

Figure 8:
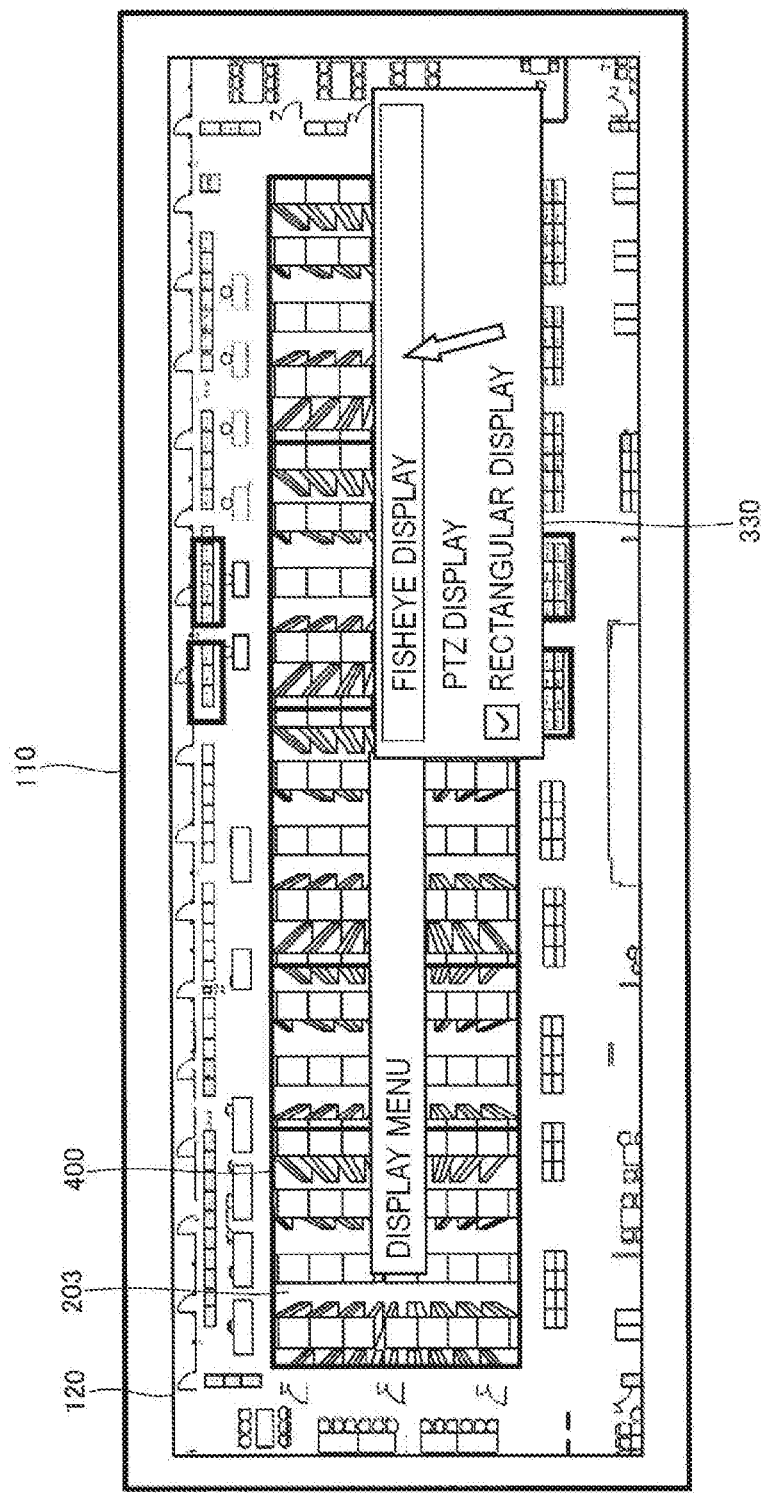
FIG. 8 shows an example of an image format switching UI according to the one embodiment.
Figure 9:
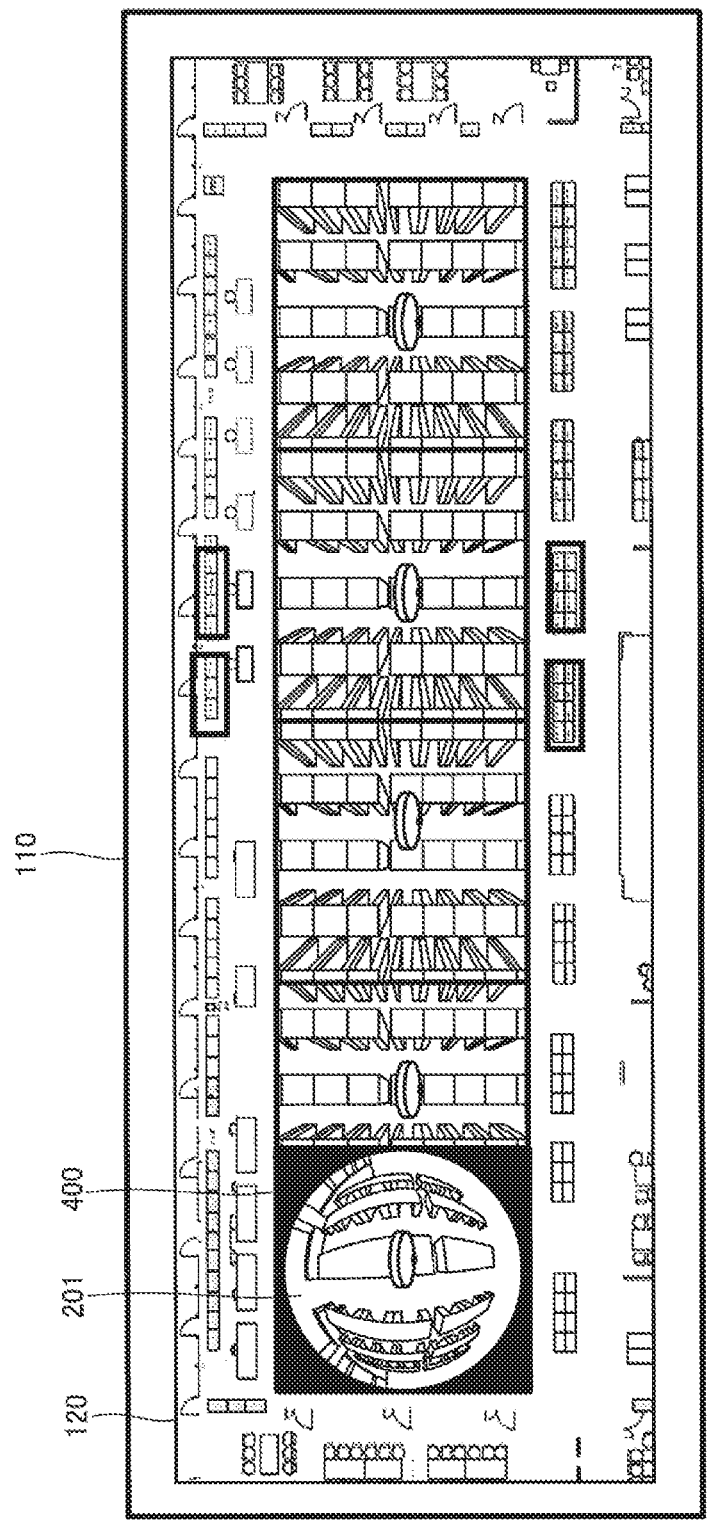
FIG. 9 shows an example of switching one rectangular image to the fisheye image on the monitoring UI according to the one embodiment.
Figure 10:
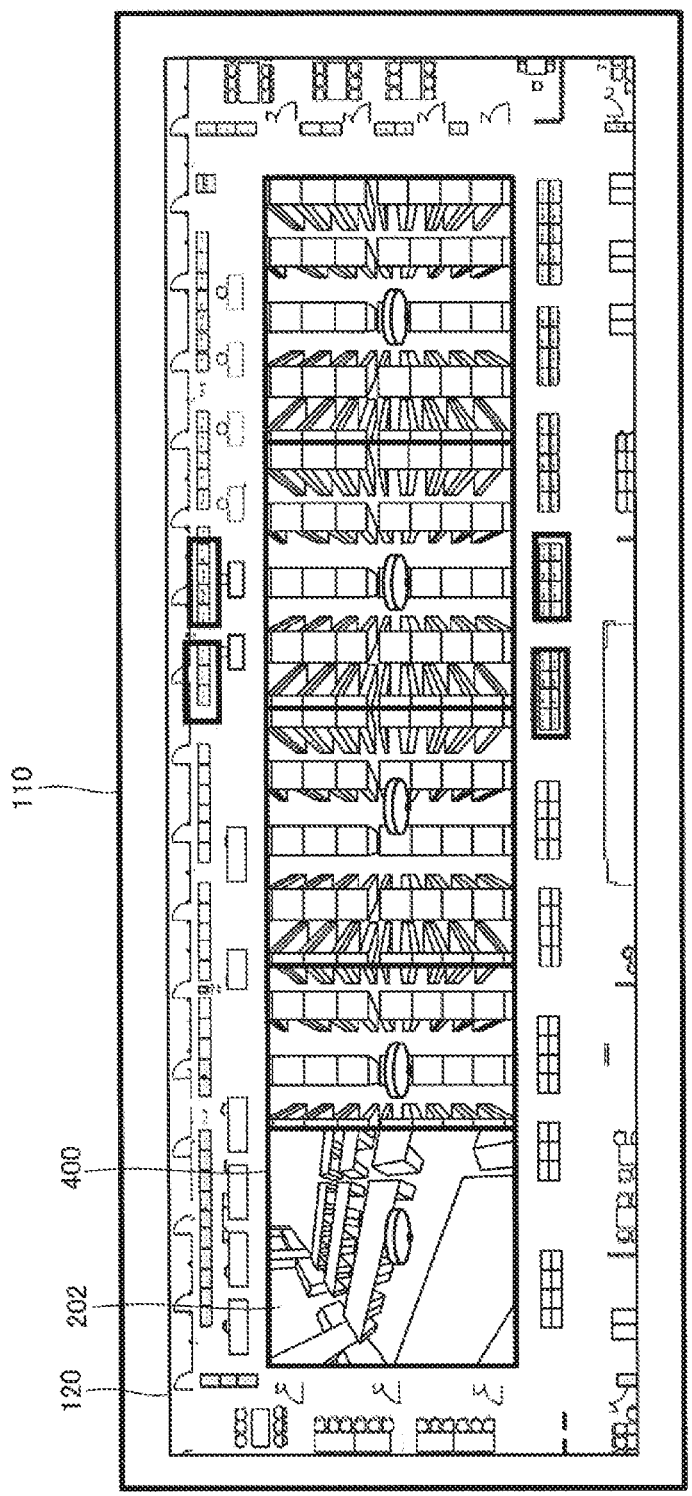
FIG. 10 shows an example of switching one rectangular image to the PTZ image on the monitoring UI according to the one embodiment.

For example, as shown in FIG. 8, when the monitoring operator selects the "fisheye display" from the image format switching UI 330, the UI controller 105 switches the rectangular image 203 in the selected image window 400 to the fisheye image 201 as shown in FIG. 9. For example, when the monitoring operator selects the "PTZ display" from the image format switching UI 330, the UI controller 105 switches the rectangular image 203 in the selected image window 400 to the PTZ image 202 as illustrated in FIG. 10.

In this way, the monitoring operator can switch the images of each image window 400 arranged on the monitoring UI 110 to images having different formats by a simple operation. For example, the monitoring operator can display the rectangular image 203 in the image window 400 arranged in accordance with paths of the floor, and display the PTZ image 202 in the image window 400 arranged in the vicinity of an entrance of the floor. Accordingly, the monitoring operator can monitor a face of a person from the PTZ image 202 arranged in the vicinity of the entrance and monitor a movement path of the person from a plurality of rectangular images 203 arranged in the floor paths.

Figure 11:
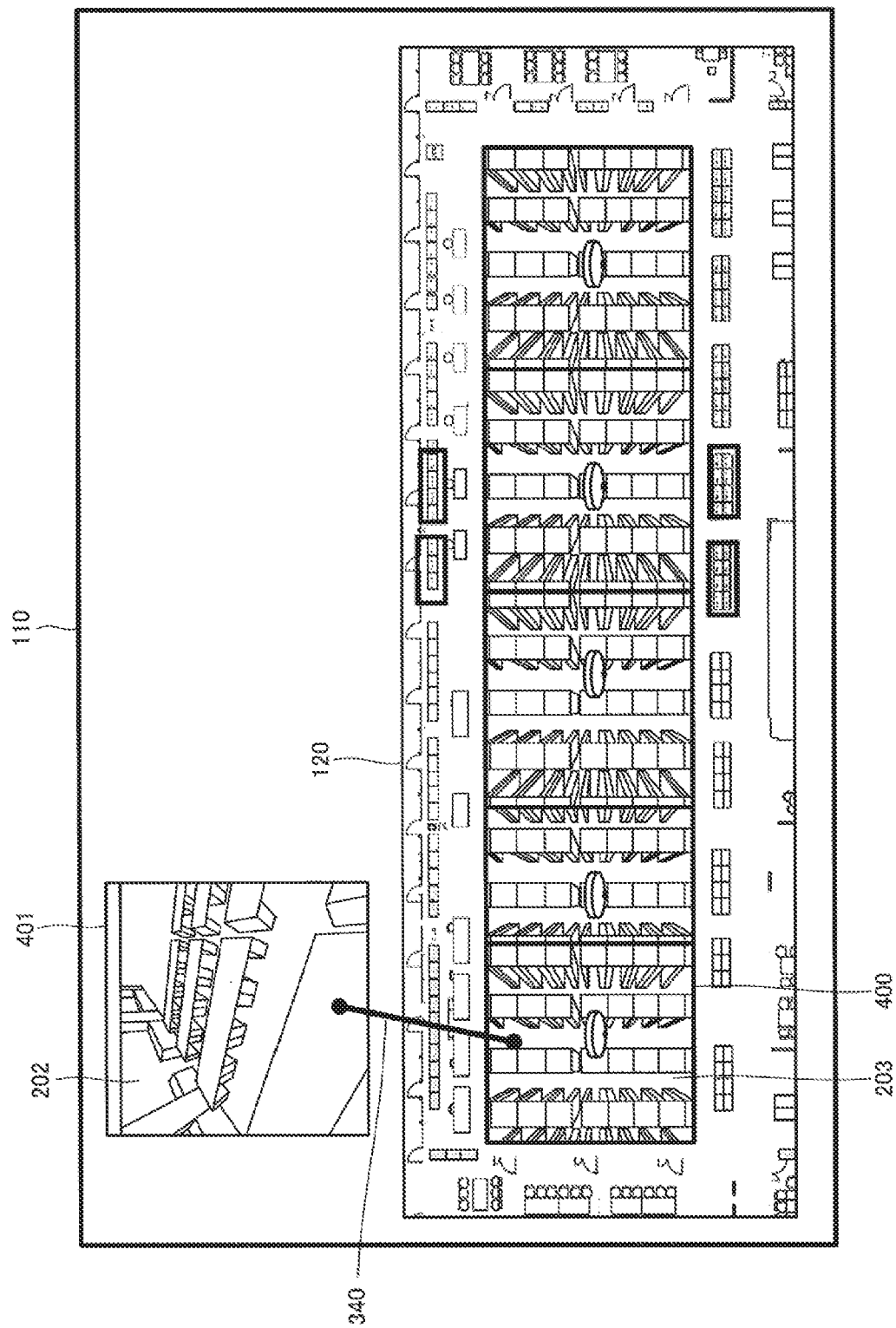
FIG. 11 shows an example of displaying the PTZ image corresponding to the one rectangular image on another image window on the monitoring UI according to the one embodiment.

It should be noted that instead of switching the images of the selected image window 400 to the images having different formats, the UI controller 105 may display the images having different formats in another image window different from the selected image window 400. For example, as shown in FIG. 11, the PTZ image 202 may be displayed in another image window 401 while the rectangular image 203 is displayed in the selected image window 400. In this case, as shown in FIG. 11, the UI controller 105 may display a line 340 indicating relevance between the selected image window 400 and the other image window 401 on the monitoring UI 110.

Figure 12:
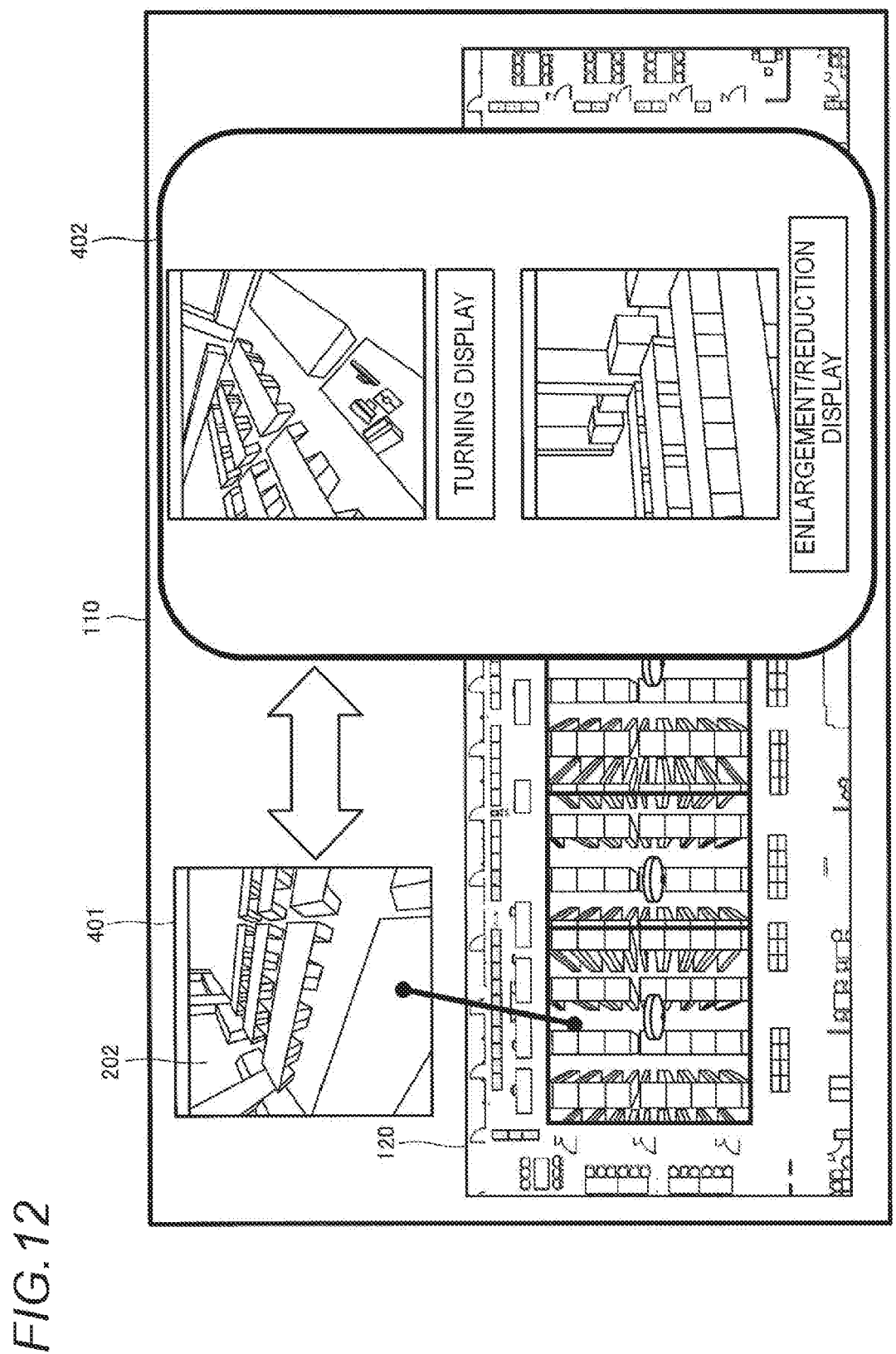
FIG. 12 shows an example of a turning display and an enlargement/reduction display for the PTZ image displayed in the other image window on the monitoring UI according to the one embodiment.

As shown in FIG. 12, the UI controller 105 may receive an operation of turning display and/or enlargement/reduction display for the PTZ image 202 displayed in the other image window 401. The UI controller 105 may display the turning display and/or the enlargement/reduction display in an image window 402 different from the image window 401 for the PTZ image 202.

<Image Parameter Setting>

Next, the image parameter setting will described with reference to FIGS. 13 to 18.

The UI controller 105 receives setting of image parameters for each image window 400 included on the monitoring UI 110. For example, when the monitoring operator selects one image window 400 and performs an image parameter setting operation, as shown in FIG. 13, a U configured to set image parameters (hereinafter referred to as the "image parameter setting UI") 500 is displayed.

Figure 13:
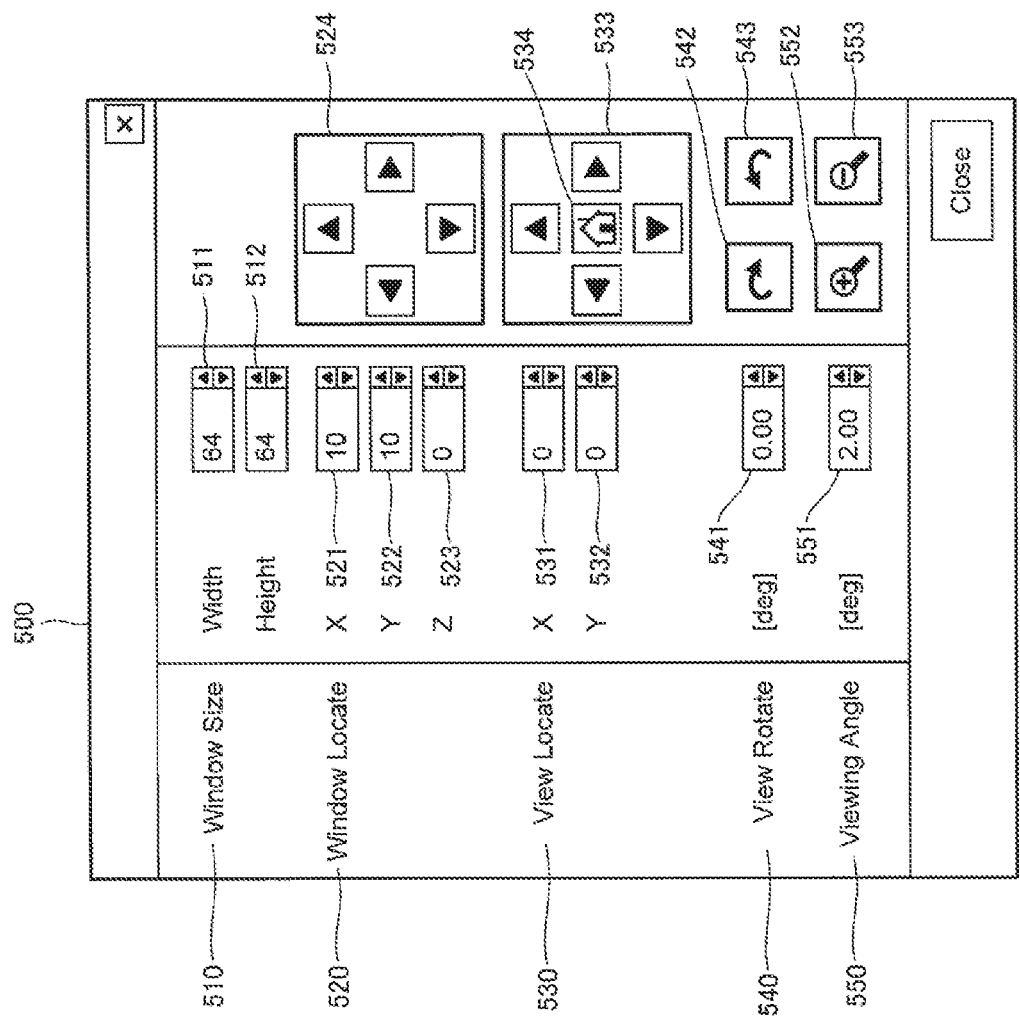
FIG. 13 shows an example of an image parameter setting UI according to the one embodiment.

As shown in FIG. 13, the image parameter setting UI 500 provides a UI configured to input window size, window position, image position, image rotation angle, and image viewing angle as an example of the image parameters (hereinafter referred to as the "input UI").

A window size input UI 510 receives input of width and height of the image window 400. As shown in FIG. 13, the window size input UI 510 may include UIs 511, 512 configured to input numerical values of the width and height.

Figure 14:
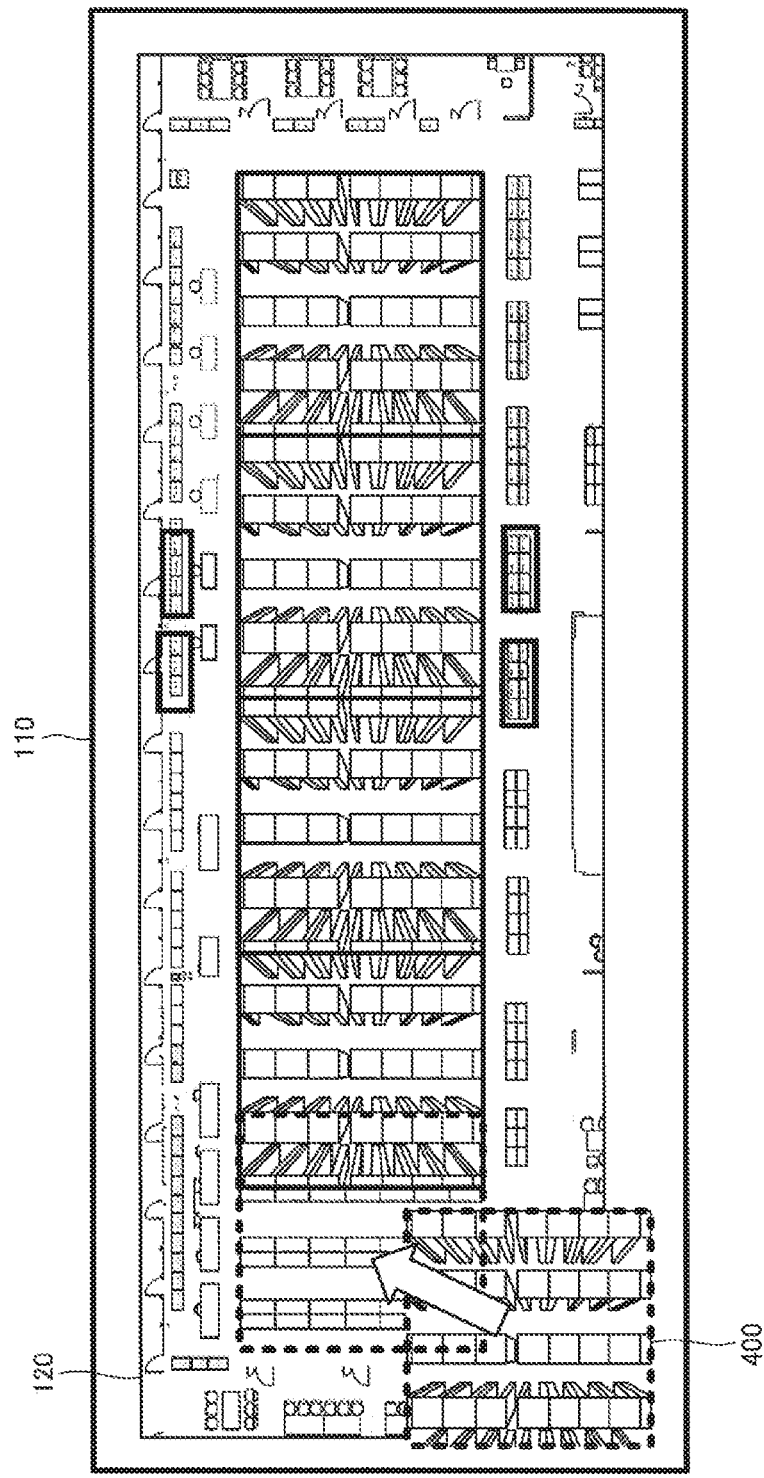
FIG. 14 shows an example of movement of an image window according to the one embodiment.

A window position input UI 520 receives input of a position (X coordinate and Y coordinate) of the image window 400. As shown in FIG. 13, the window position input UI 520 may include UIs 521, 522 configured to input numerical values of the X coordinate and the Y coordinate, and a UI 524 configured to input a direction. The direction input UI 524 increases or decreases the X coordinate and/or the Y coordinate of the image window 400 in units of a predetermined size (for example by ten) according to the input direction. For example, the monitoring operator first operates the direction input UI 524 to roughly set the position (the X coordinate and the Y coordinate) of the image window 400, and then operates the numerical value input UIs 521, 522 to finely adjust the position (the X coordinate and the Y coordinate) of the image window 400. Accordingly, the monitoring operator can quickly and accurately move the image window 400 to a desired location on the monitoring UI 110 (or in the monitoring area diagram 120), as shown in FIG. 14.

Figure 15:
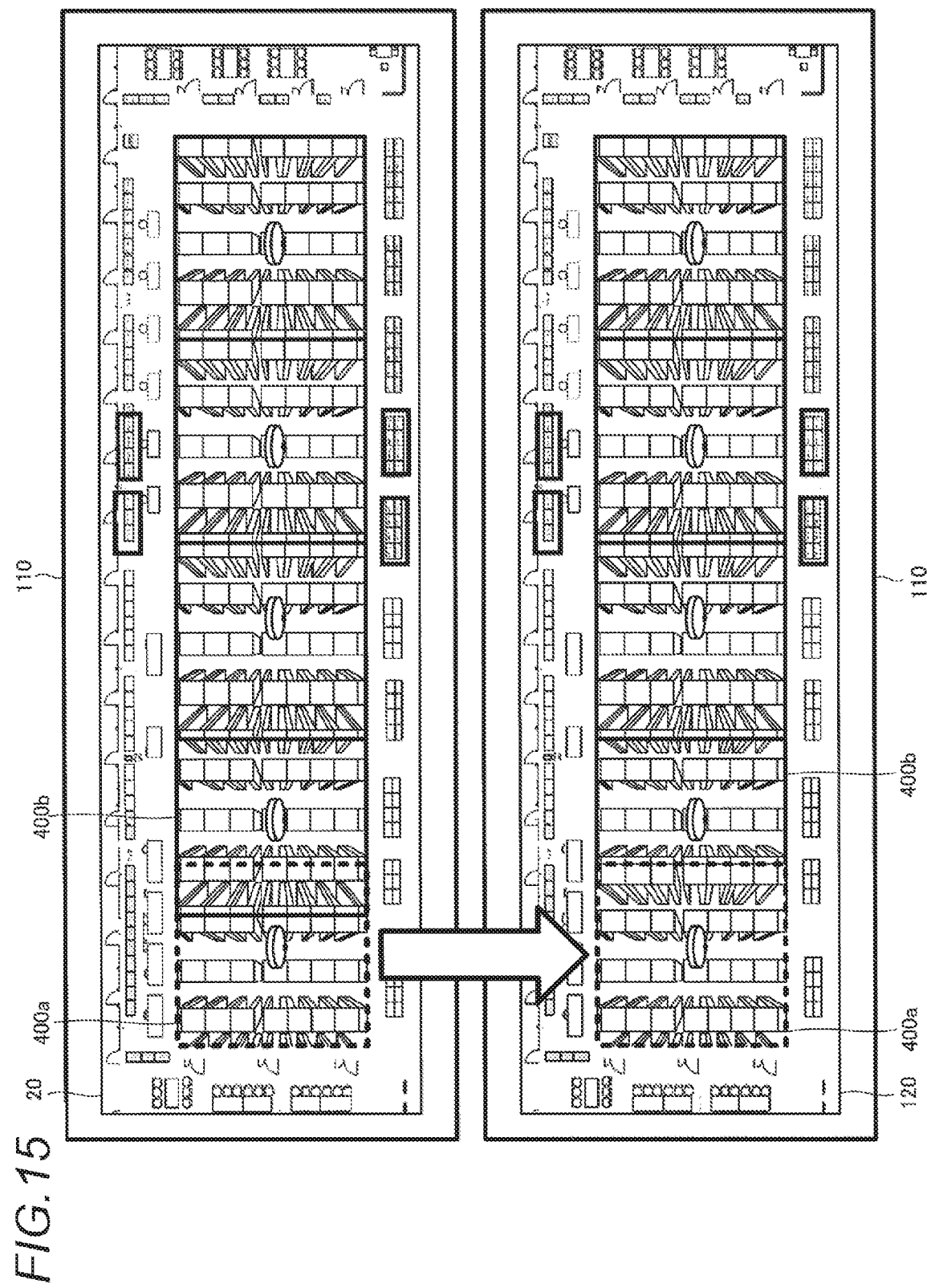
FIG. 15 shows an example of changing display priority of an image window according to the one embodiment.

Further, the window position input UI 520 receives an input of display priority (Z coordinate) of the image window 400. When a plurality of the image windows 400 overlap each other, the image window 400 having larger priority (the Z coordinate) is displayed on a front surface. By operating a UI 523 configured to input a numerical value of the Z coordinate, the monitoring operator can display a desired image window 400a on the front surface when image windows 400a and 400b overlap each other, as shown in FIG. 15.

Figure 16:
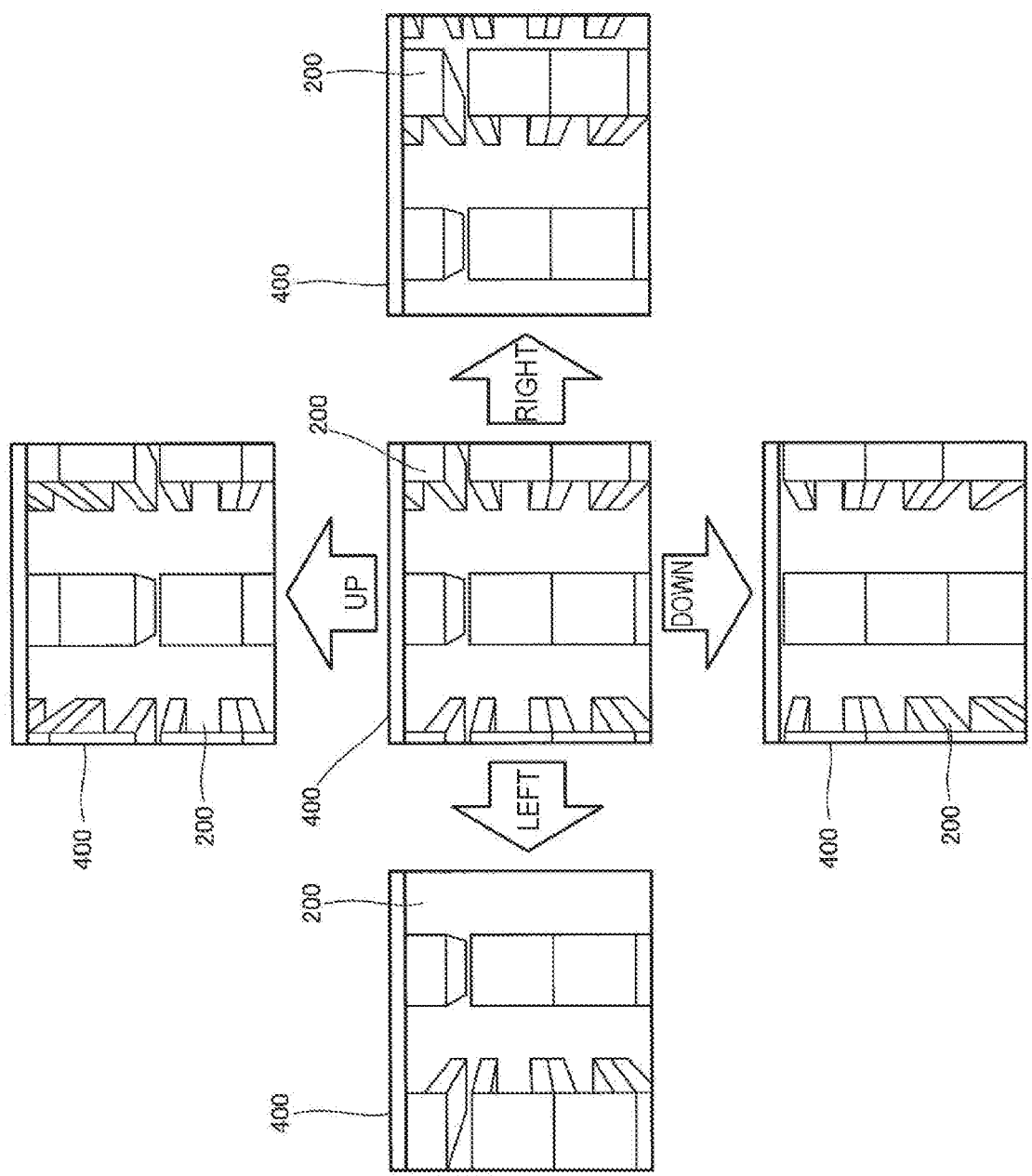
FIG. 16 shows an example of changing a position of an image in an image window according to the one embodiment.

An image position input UI 530 receives input of the position (the X coordinate and the Y coordinate) of an image 200 (see FIG. 16) displayed in the image window 400. The image 200 may be any one of the fisheye image 201, the PTZ image 202, and the rectangular image 203 described above. As shown in FIG. 13, the image position input UI 530 may include UIs 531, 532 configured to input numerical values of the X coordinate and the Y coordinates, and a UI 533 configured to input a direction. The direction input UI 533 increases or decreases the X coordinate and the Y coordinates of the image 200 displayed in the image window 400 in units of a predetermined size (for example, by five) according to the input direction. The image position input UI 530 may include an initialization UI 534 configured to set the position of the image 200 in the image window 400 to a default position. For example, the monitoring operator first operates the direction input UI 533 to roughly set the position (the X coordinate and the Y coordinate) of the image 200 in the image window 400, and then operates the numerical value input UIs 531, 532 to finely adjust the position (the X coordinate and the Y coordinate) of the image 200 in the image window 400. Accordingly, the monitoring operator can quickly and accurately adjust the position of the image 200 displayed in the image window 400, as shown in FIG. 16.

Figure 17:
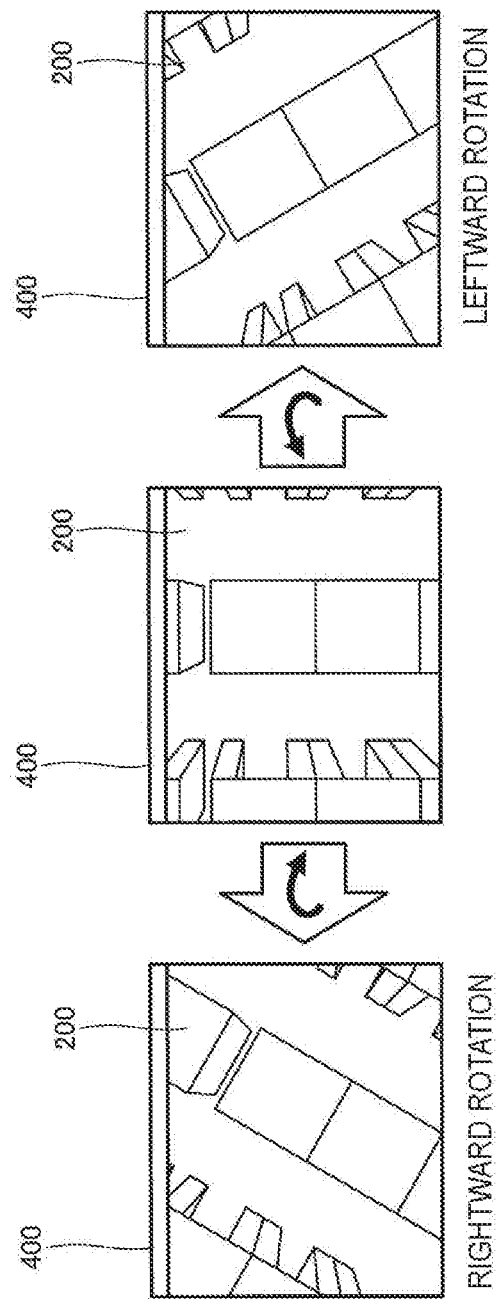
FIG. 17 shows an example of changing a rotation angle of the image in the image window according to the one embodiment.

An image rotation angle input UI 540 receives input of a rotation angle of the image 200 (see FIG. 17) displayed in the image window 400. As shown in FIG. 13, the image rotation angle input UI 540 may include a UI 541 configured to input a numerical value of the rotation angle, a rightward rotation UI 542, and a leftward rotation UI 543. The rightward rotation UI 542 rotates the image 200 in the image window 400 rightward by 90 degrees. The leftward rotation UI 543 rotates the image 200 in the image window 400 leftward by 90 degrees. For example, the monitoring operator first operates the rightward rotation UI 542 or the leftward rotation UI 543 to roughly set the rotation angle of the image 200 in the image window 400, and then operates the numerical value input UI 541 to finely adjust the rotation angle of the image 200 in the image window 400. Accordingly, the monitoring operator can quickly and accurately adjust the rotation angle of the image 200 displayed in the image window 400, as shown in FIG. 17.

Figure 18:
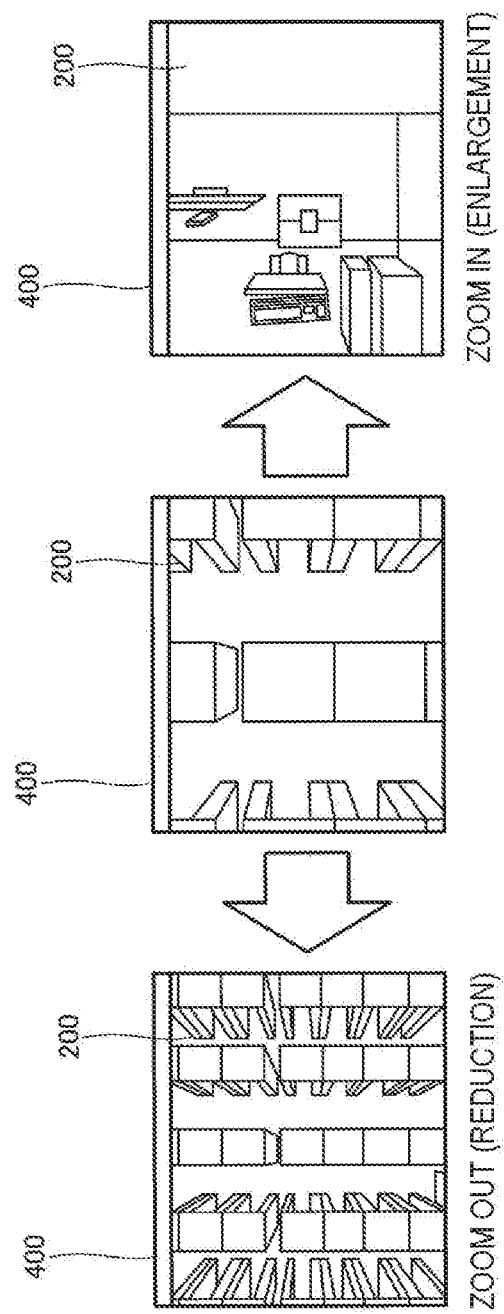
FIG. 18 shows an example of changing a viewing angle of the image in the image window according to the one embodiment.

An image viewing angle input UI 550 receives input of a viewing angle of the image 200 (see FIG. 18) displayed in the image window 400. As shown in FIG. 13, the image viewing angle input UI 550 may include a UI 551 configured to input a numerical value of the viewing angle, a viewing angle enlarging UI 552, and a viewing angle reducing UI 553. The viewing angle enlarging UI 552 increases (that is, zooms in) the viewing angle of the image 200 in the image window 400 in units of a predetermined size (for example, by 5). The viewing angle reducing UI 553 reduces (that is, zooms out) the viewing angle of the image 200 in the image window 400 in units of a predetermined size. For example, the monitoring operator first operates the viewing angle enlarging UI 552 or the viewing angle reducing UI 553 to roughly set the viewing angle of the image 200 in the image window 400, and then operates the viewing angle numerical value input UI 551 to finely adjust the viewing angle of the image 200 in the image window 400. Accordingly, the monitoring operator can quickly and accurately adjust the viewing angle of the image 200 displayed in the image window 400, as shown in FIG. 18.

<Flowchart>

Figure 19:
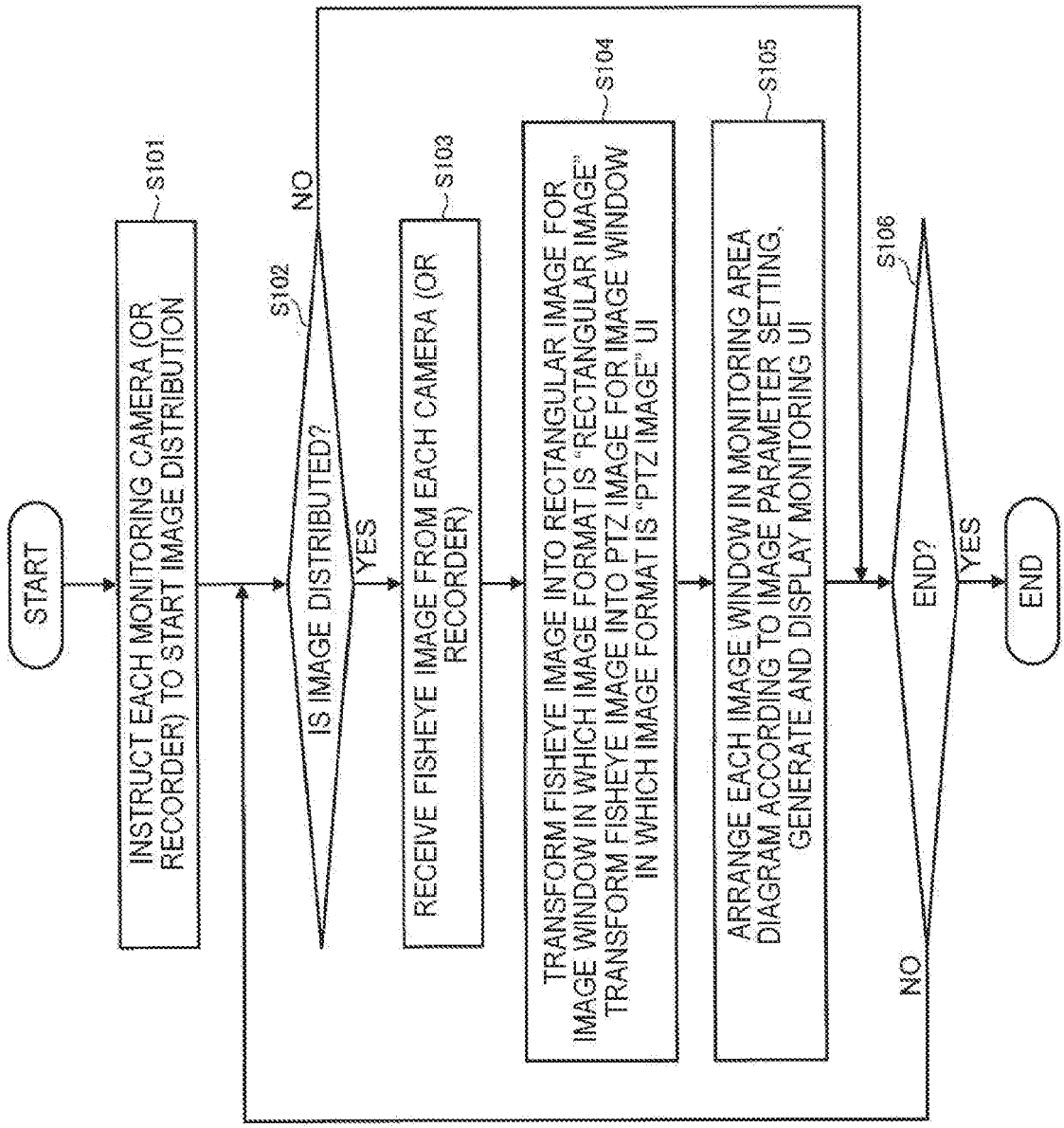
FIG. 19 is a flowchart showing an operation example of the monitoring device according to the one embodiment.

Next, an example of an operation of the monitoring device 10 will be described with reference to a flowchart shown in FIG. 19.

The UI controller 105 transmits an instruction to each monitoring camera (or the recorder 3) to start image distribution (S101).

When no image is distributed from each monitoring camera 2 (or the recorder 3) (S102: NO), processing S106 is executed, and when an image is distributed (S102: YES), processing S103 is executed.

The image receiver 101 receives the fisheye image 201 from each monitoring camera 2 (or the recorder 3) (S103).

The image transformer 102 transforms the fisheye image 201 into the rectangular image 203 for the image window 400 in which the image format is set as "rectangular image". The image transformer 102 transforms the fisheye image 201 into the PTZ image 202 for the image window 400 in which the image format is set as "PTZ image" (S104).

The UI controller 105 arranges each image window 400 in the monitoring area diagram 120 according to the image parameter setting, and generates the monitoring UI 110. Then the UI controller 105 displays the monitoring UI 110 on the display (S105).

When an end of the monitoring is not instructed by the monitoring operator (S106: NO), S102 to S105 are executed, and when the end of the monitoring is instructed (S106: YES), the processing is ended.

<Operation Example of Monitoring System>

Figure 20:
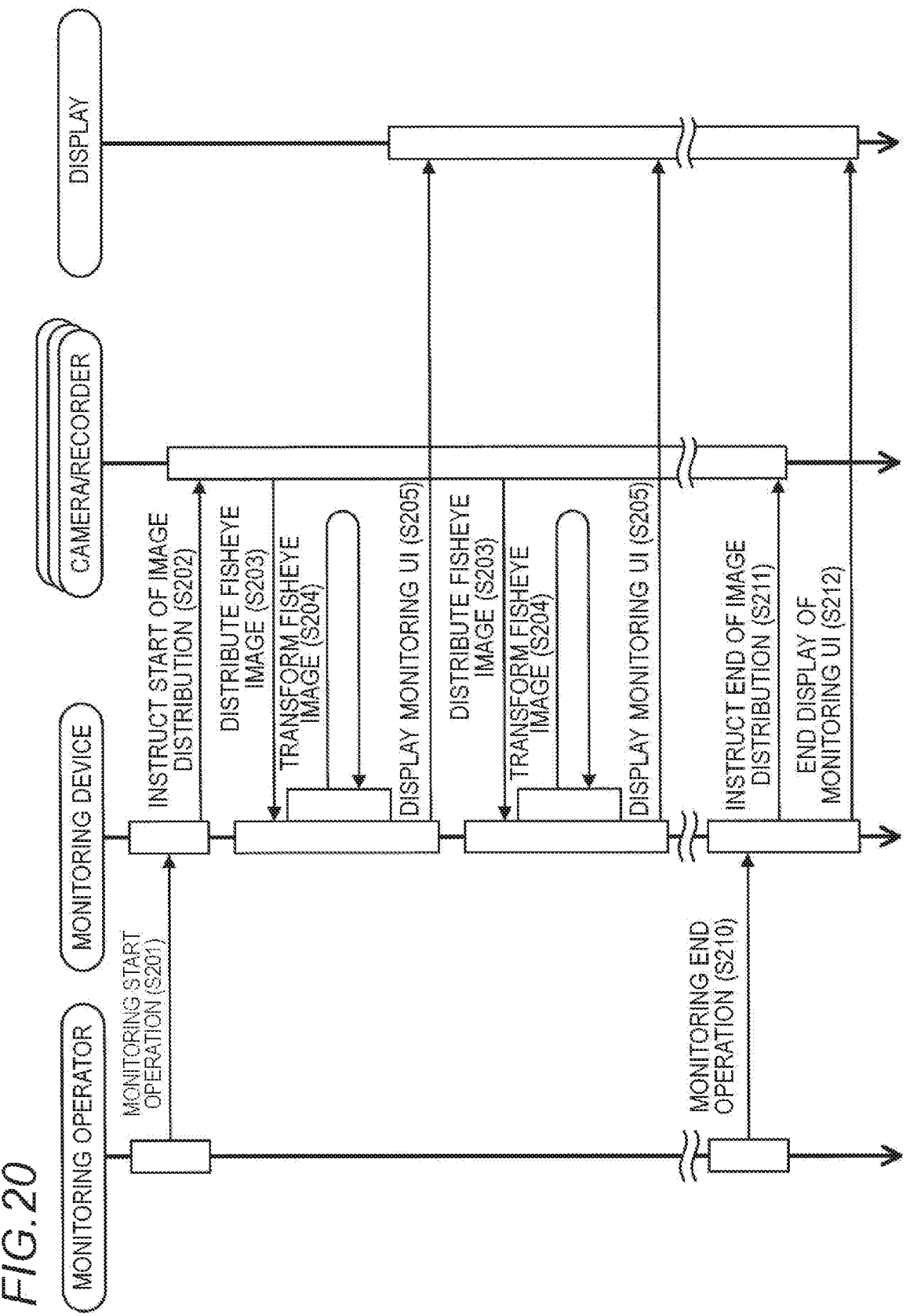
FIG. 20 is a sequence chart showing an operation example of the monitoring system according to the one embodiment.

Next, an example of an operation of the monitoring system 1 will be described with reference to the sequence chart shown in FIG. 20.

When a monitoring start operation is performed by the operator (S201), the monitoring device 10 transmits an instruction to each monitoring camera 2 (or the recorder 3) to start the image distribution (S202).

Upon receiving the instruction to start the image distribution, each monitoring camera 2 (or the recorder 3) distributes the fisheye image 201 to the monitoring device 10 (S203).

The monitoring device 10 receives the fisheye image 201 from each monitoring camera 2 (or the recorder 3), and transforms the fisheye image 201 into the rectangular image 203 or the PTZ image 202 in accordance with the image format setting (S204).

The monitoring device 10 generates the monitoring UI 110 and displays the UI on the display (S205).

The monitoring system 1 repeats processing S203 to S205. Accordingly, the image in the image window 400 included on the monitoring UI 110 is updated.

When a monitoring end operation is performed by the operator (S210), the monitoring device 10 transmits an instruction to each monitoring camera 2 (or the recorder 3) to end the image distribution (S211). Upon receiving the instruction of S211, each monitoring camera 2 (or the recorder 3) stops the distribution of the fisheye image 201 to the monitoring device 10.

The monitoring device 10 ends the display of the monitoring UI 110 on the display (S212).

<Modification>

Next, several modifications of the monitoring system 1 according to the present embodiment will be described.

Figure 21:
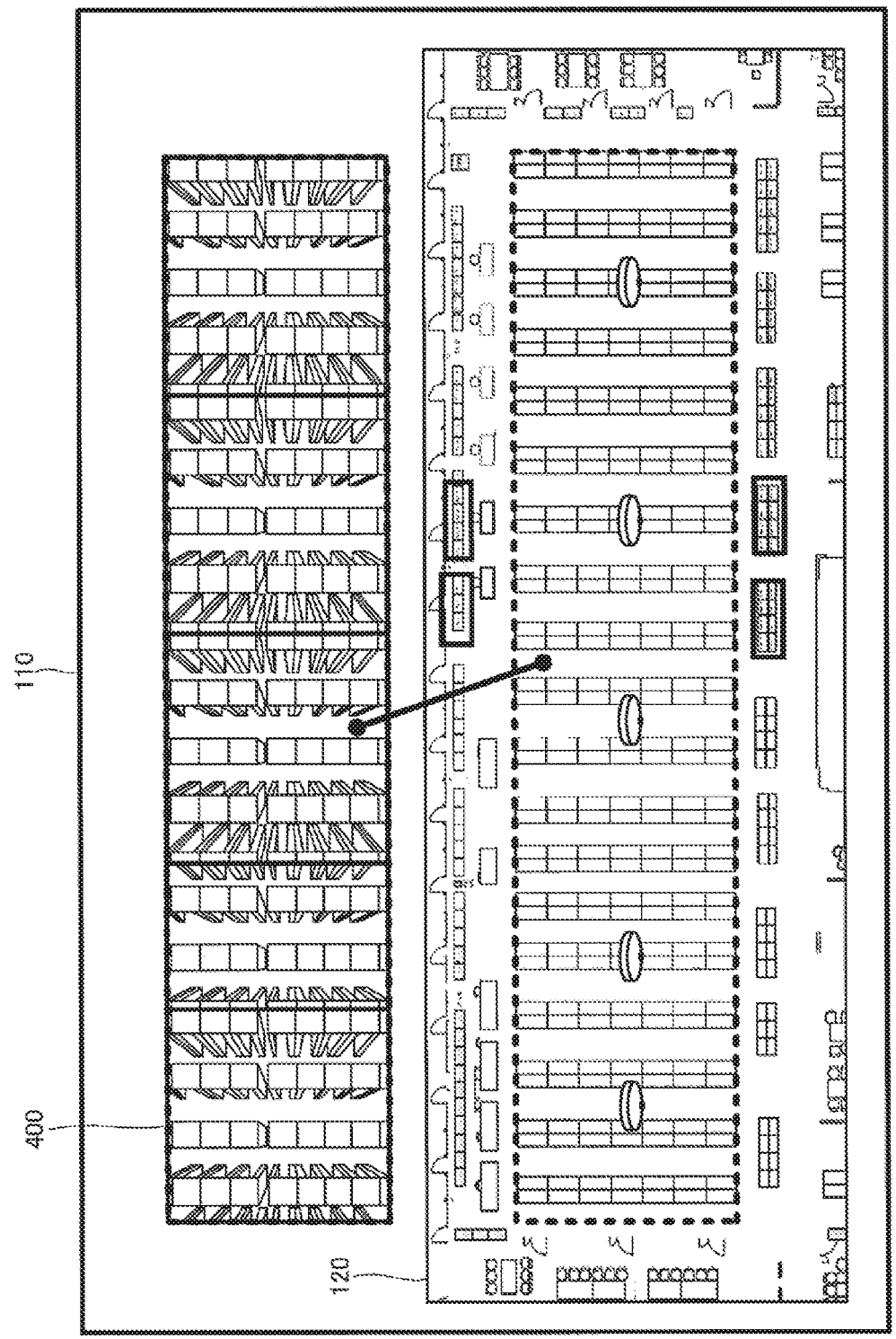
FIG. 21 shows an example of displaying the image window in parallel with a monitoring area diagram on the monitoring UI according to the one embodiment.

The present invention is not limited to the case where the image window 400 is superimposed on the monitoring area diagram 120 on the monitoring UI 110. For example, as shown in FIG. 21, the image window 400 may be displayed in parallel with the monitoring area diagram 120 on the monitoring UI 110.

Figure 22:
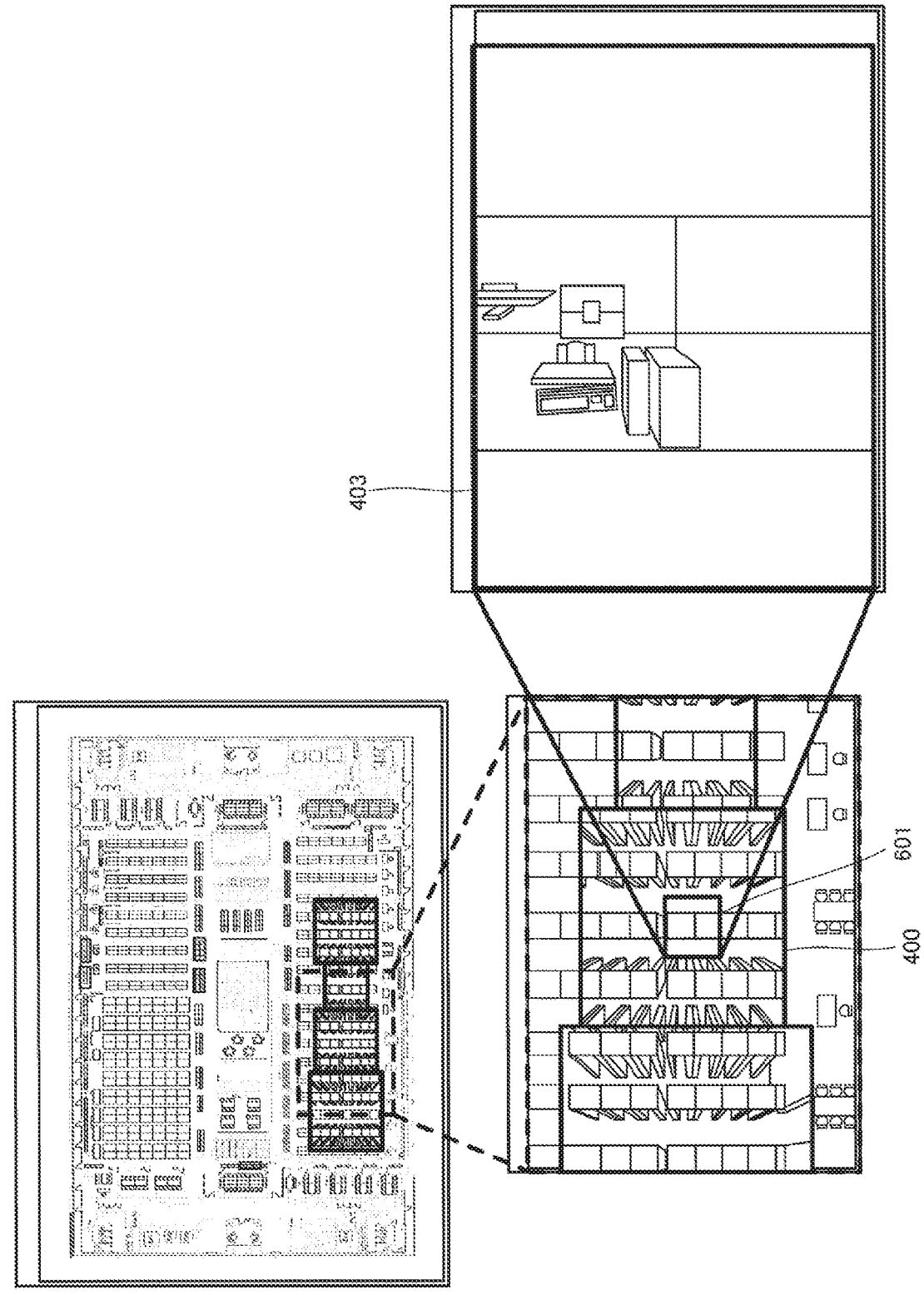
FIG. 22 shows an example of enlargement display of a partial region in the image window on the monitoring UI according to the one embodiment.

The monitoring UI 110 may also provide a UI configured to display a part of the image in the image window 400 in an enlarged manner, and a UI configured to scroll the display upward, downward, leftward, and rightward while the image is displayed in the enlarged manner. For example, as shown in FIG. 22, the monitoring operator may be able to enlarge a partial region in the image window 400 of the monitoring UI 110 by operating the operation device 4. As shown in FIG. 22, when the monitoring operator designates a partial region 601 in the image window 400 on the monitoring UI 110, the UI controller 105 may display the image in the designated partial region 601 in another image window 403 in the enlarged manner. The monitoring operator may operate the operation device 4 to move (that is, to scroll the display) the enlarged display described above upward, downward, leftward, and rightward.

Figure 23:
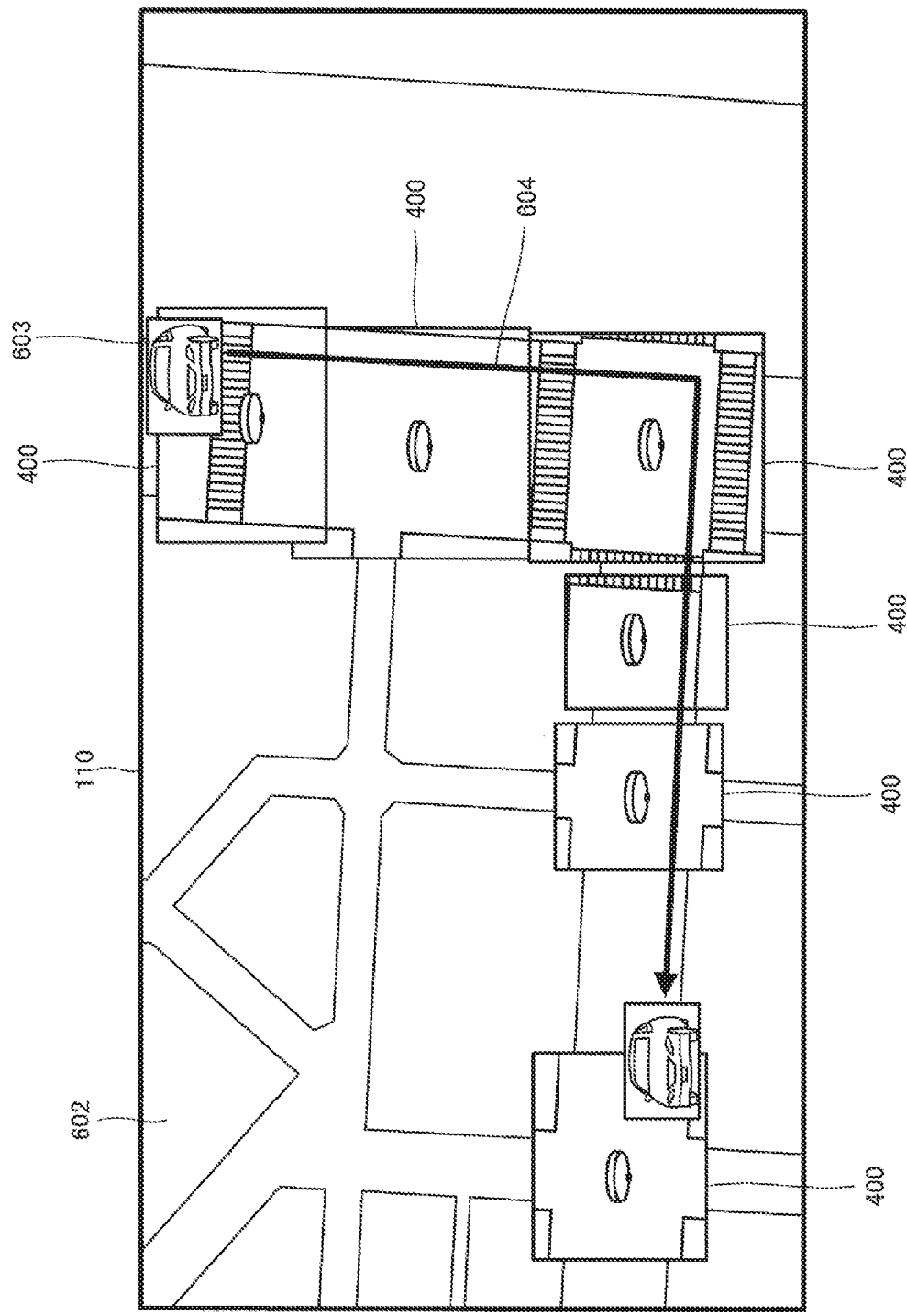
FIG. 23 shows an example of arranging the image window on a map on the monitoring UI according to the one embodiment.

On the monitoring UI 110, the image window 400 may be arranged at any position in any size on the monitoring area diagram 120. For example, as shown in FIG. 23, the monitoring operator may adjust a position and a size of each image window 400 on the monitoring UI 110 such that the image in the image window 400 matches roads of a map 602, and arrange the image on the map. Accordingly, the monitoring operator can easily grasp a movement path 604 of an automobile 603 from the monitoring UI 110.

<Summary of Present Disclosure>

The monitoring device 10 according to the present disclosure includes: the image receiver 101, configured to receive the fisheye image 201 of the bird's eye viewpoint captured by the plurality of monitoring cameras 2; an image transformer 102, configured to transform the fisheye image 201 into the rectangular image 203 of the bird's eye viewpoint or a different viewpoint image (for example the PTZ image 202); and the UI controller 105, configured to provide the image format switching UI 330, which arranges the plurality of image windows 400 respectively corresponding to the plurality of monitoring cameras 2, displays the rectangular image 203 in the image windows 400, and switches the displayed image to the different viewpoint image for each image window 400.

According to this configuration, the monitoring operator can easily grasp the situation of the monitoring area from a plurality of the rectangular images 203 of the bird's eye viewpoint, and can easily switch the displayed image to the different viewpoint image for any image window 400 through the image format switching UI 330.

The embodiment according to the present invention have been described in detail with reference to the drawings, and functions of devices such as the recorder 3 and the monitoring device 10 described above can be realized by a computer program.

Figure 24:
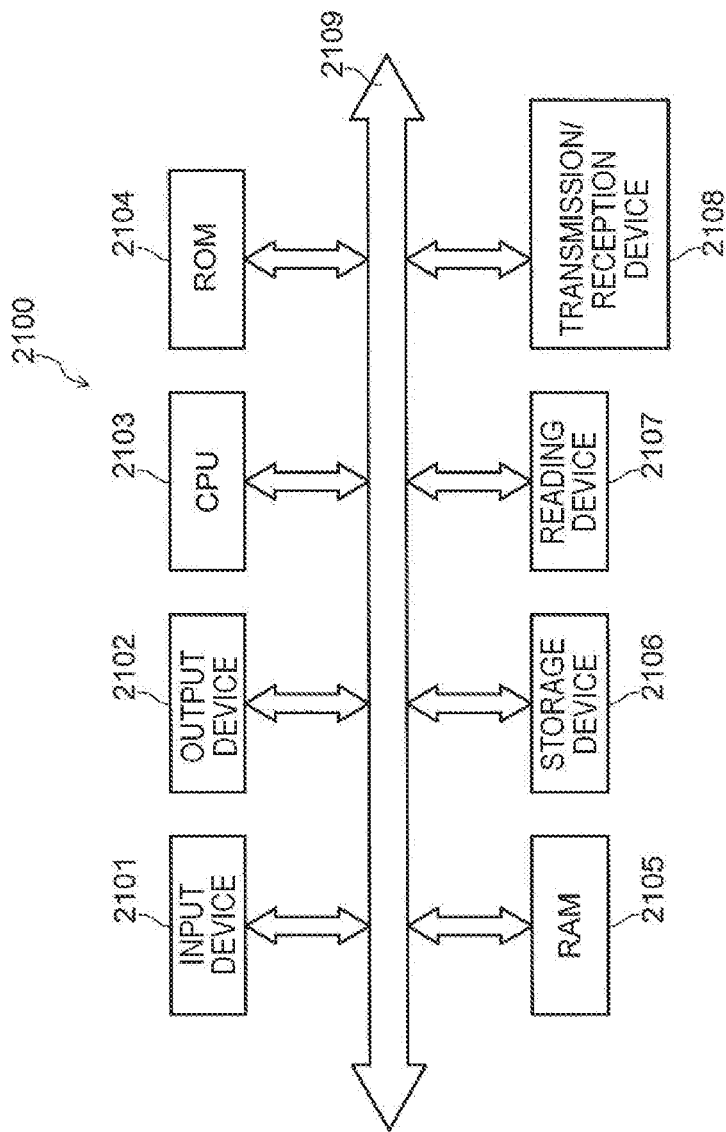
FIG. 24 shows an example of a hardware configuration of the device according to the present disclosure.

FIG. 24 shows a hardware configuration of a computer that realizes the functions of the devices by a program. The computer 2100 includes: an input device 2101 such as a keyboard, a mouse or a touch pad; an output device 2102 such as a display or a speaker; a central processing unit (CPU) 2103; a read only memory (ROM) 2104; a random access memory (RAM) 2105; a storage device 2106 such as a hard disk device or a solid state drive (SSD); a reading device 2107 which reads information from a recording medium such as a digital versatile disk read only memory (DVD-ROM) or a universal serial bus (USB) memory; and a transmission and reception device 2108 configured to perform communication via a network, and each portion is connected by a bus 2109.

The reading device 2107 reads a program from a recording medium which stores a program configured to realize the functions of the devices, and stores the program in the storage device 2106. Alternatively, the transmission and reception device 2108 communicates with a server device connected to the network, and stores a program, which is configured to realize the functions of the devices, downloaded from the server device in the storage device 2106.

The CPU 2103 copies the program stored in the storage device 2106 to the RAM 2105, and sequentially reads and executes commands contained in the program from the RAM 2105, thereby realizing the functions of the devices.

The present disclosure may be realized by software, hardware, or software linked with hardware.

Each functional block used in the description of the above embodiment may be partially or entirely realized as an LSI which is an integrated circuit, and each process described in the above embodiment may be partially or entirely controlled by a single LSI or a combination of LSIs. The LSI may be configured by individual chips, or may be configured by a single chip which includes a part or all of the functional blocks. The LSI may include input and output of data. The LSI may be referred to as an IC, a system LSI, a super LSI, or an ultra LSI depending on a degree of integration.

The method of circuit integration is not limited to the LSI, and may be realized by a dedicated circuit, a general-purpose processor, or a dedicated processor. A field programmable gate array (FPGA) that can be programmed after manufacturing the LSI, or a reconfigurable processor that can reconfigure connections and settings of circuit cells inside the LSI may also be used. The present disclosure may be realized as digital processing or analog processing.

Further, if an integrated circuit technology emerges due to a progress of a semiconductor technology or another derivative technology to replace the LSI, the technology may naturally be used to integrate the functional blocks. Application of biotechnology or the like may also be possible.

One aspect of the present disclosure is useful for monitoring systems.

What is claimed is:

1. A monitoring device, comprising:
    a receiver configured to receive a plurality of fisheye images, each being of a bird's eye viewpoint and captured by a corresponding one of a plurality of monitoring cameras;
    a processor configured to transform the plurality of fisheye images into a plurality of rectangular images and into a plurality of different viewpoint images, the plurality of rectangular images each being of the bird's eye viewpoint, the plurality of different viewpoint images each being of a viewpoint different from the bird's eye viewpoint; and
    the processor further configured to provide a user interface (UI) which arranges a plurality of image windows respectively corresponding to the plurality of monitoring cameras, displays images corresponding to the plurality of monitoring cameras in the plurality of image windows, and switches a displayed image from the bird's eye viewpoint to the viewpoint different from the bird's eye viewpoint for the plurality of image windows in response to an image format switching operation,
    wherein the plurality of different viewpoint images is obtained by transforming parts of the plurality of fisheye images through at least one of panning, tilting, or zooming, and
    in response to a predetermined operation, in the plurality of image windows, the processor displays a different viewpoint image for one of the plurality of monitoring cameras corresponding to a predetermined area and, at a same time, displays rectangular images for the plurality of monitoring cameras other than the one of the plurality of monitoring cameras corresponding to the predetermined area.

2. The monitoring device according to claim 1, further comprising:
    a memory, configured to store a monitoring area diagram, which is a bird's eye view of a monitoring area of the plurality of monitoring cameras, wherein the processor displays the monitoring area diagram and superimposes the plurality of image windows on the monitoring area diagram.

3. The monitoring device according to claim 1, wherein the processor provides the user interface (UI) that sets, for each image window of the plurality of image windows in which one of the rectangular images is displayed, a position and a size of the image window, and at least one of the following: a position; a rotation angle; and a viewing angle of a corresponding one of the rectangular images displayed by the image window.

4. The monitoring device according to claim 1, wherein the plurality of fisheye images is transformed into the plurality of rectangular images by correcting distortion of the plurality of fisheye images.

5. The monitoring device according to claim 4, wherein the rectangular images are displayed in parallel in corresponding ones of the plurality of image windows such that a movement path in a monitoring area of the plurality of monitoring cameras other than the one of the plurality of monitoring cameras corresponding to the predetermined area is continuous between the rectangular images.

6. The monitoring device according to claim 5, wherein the user interface sets a corresponding one of the plurality of rectangular images as a default image for each of the plurality of image windows.

7. The monitoring device according to claim 6, wherein the processor is further configured to receive a selection operation for selecting one of the plurality of image windows, and to switch the displayed image from the bird's eye image to the viewpoint different from the bird's eye viewpoint for the selected one of the plurality of image windows in response to the image format switching operation.

8. A monitoring method implemented by a monitoring device, the monitoring method comprising:
receiving a plurality of fisheye images, each being of a bird's eye viewpoint and captured by a corresponding one of a plurality of monitoring cameras;
transforming the plurality of fisheye images into a plurality of rectangular images and into a plurality of different viewpoint images, the plurality of rectangular images each being of the bird's eye viewpoint, the plurality of different viewpoint images each being of a viewpoint different from the bird's eye viewpoint; and
providing a user interface (UI) which arranges a plurality of image windows respectively corresponding to the plurality of monitoring cameras, displays images corresponding to the plurality of monitoring cameras in the plurality of image windows, and switches a displayed image from the bird's eye viewpoint to the viewpoint different from the bird's eye viewpoint for the plurality of image windows in response to an image format switching operation,
wherein the plurality of different viewpoint images is obtained by transforming parts of the plurality of fisheye images through at least one of panning, tilting, or zooming, and
in response to a predetermined operation, in the plurality of image windows, a different viewpoint image is displayed for one of the plurality of monitoring cameras corresponding to a predetermined area and, at a same time, rectangular images are displayed for the plurality of monitoring cameras other than the one of the plurality of monitoring cameras corresponding to the predetermined area.

9. A non-transitory computer-readable storage medium storing a computer program, which causes a computer to execute operations, the operations comprising:
receiving a plurality of fisheye images, each being of a bird's eye viewpoint and captured by a corresponding one of a plurality of monitoring cameras;
transforming the plurality of fisheye images into a plurality of rectangular images and into a plurality of different viewpoint images, the plurality of rectangular images each being of the bird's eye viewpoint, the plurality of different viewpoint images each being of a viewpoint different from the bird's eye viewpoint; and
providing a user interface (UI) which arranges a plurality of image windows respectively corresponding to the plurality of monitoring cameras, displays images corresponding to the plurality of monitoring cameras in the plurality of image windows, and switches a displayed image from the bird's eye viewpoint to the viewpoint different from the bird's eye viewpoint for the plurality of image windows in response to an image format switching operation,
wherein the plurality of different viewpoint images is obtained by transforming parts of the plurality of fisheye images through at least one of panning, tilting, or zooming, and
in response to a predetermined operation, in the plurality of image windows, a different viewpoint image is displayed for one of the plurality of monitoring cameras corresponding to a predetermined area and, at a same time, rectangular images are displayed for the plurality of monitoring cameras other than the one of the plurality of monitoring cameras corresponding to the predetermined area.

* * * * *